US012783073B2

(12) United States Patent
Wang et al.

(10) Patent No.: US 12,783,073 B2
(45) Date of Patent: Nov. 3, 2026

(54) TOUCH SUBSTRATE AND DISPLAY APPARATUS

(71) Applicants: Chengdu BOE Optoelectronics Technology Co., Ltd., Sichuan Province (CN); BOE Technology Group Co., Ltd., Beijing (CN)

(72) Inventors: Siyu Wang, Beijing (CN); Wei Wang, Beijing (CN); Yu Wang, Beijing (CN); Tianci Chen, Beijing (CN); Jianghua Liu, Beijing (CN)

(73) Assignees: Chengdu BOE Optoelectronics Technology Co., Ltd., Chengdu (CN); BOE Technology Gorup Co., Ltd., Beijing (CN)

( * ) Notice: Subject to any disclaimer, the term of this patent is extended or adjusted under 35 U.S.C. 154(b) by 0 days.

(21) Appl. No.: 18/996,575

(22) PCT Filed: Mar. 13, 2024

(86) PCT No.: PCT/CN2024/081487
§ 371 (c)(1),
(2) Date: Jan. 17, 2025

(87) PCT Pub. No.: WO2024/222266
PCT Pub. Date: Oct. 31, 2024

(65) Prior Publication Data
US 2026/0023445 A1 Jan. 22, 2026

(30) Foreign Application Priority Data
Apr. 28, 2023 (CN) ......................... 202310478673.7

(51) Int. Cl.
*G06F 3/041* (2006.01)
*G06F 3/044* (2006.01)

(52) U.S. Cl.
CPC .......... *G06F 3/0412* (2013.01); *G06F 3/0416* (2013.01); *G06F 3/0446* (2019.05)

(58) Field of Classification Search
CPC . G06F 2203/04102; G06F 2203/04112; G06F 3/0412; G06F 3/0416; G06F 3/04164; G06F 3/0446
See application file for complete search history.

(56) References Cited

U.S. PATENT DOCUMENTS

2013/0300678 A1* 11/2013 Kang .................... G06F 3/0446 345/173
2017/0212637 A1* 7/2017 Choi ..................... G06F 3/0445
(Continued)

FOREIGN PATENT DOCUMENTS

CN 206162458 U 5/2017
CN 108389869 A 8/2018
(Continued)

OTHER PUBLICATIONS

Partial Supplementary European Search Report, dated May 11, 2026, from EP Patent Application No. 24795649.3, 19 pages.

*Primary Examiner* — Robin J Mishler
(74) *Attorney, Agent, or Firm* — Workman Nydegger

(57) ABSTRACT

The present disclosure provides a touch substrate and a display apparatus. The touch substrate provided in embodiments of the present disclosure comprises a base and a plurality of touch signal lines. The base comprises a bending area and a non-bending area located beyond the bending area. The bending area extends in a first direction. The plurality of touch signal lines are located on one side of the base. At least some of the touch signal lines extend to the bending area. Each of the plurality of touch signal lines comprises: a first sub-touch signal line and a second sub-touch signal line on the side of the first sub-trace line away from the base. In the bending area, the orthographic projec-
(Continued)

tion of the first sub-touch signal line on the base falls within the orthographic projection of the second sub-touch signal line on the base.

19 Claims, 18 Drawing Sheets

(56) References Cited

U.S. PATENT DOCUMENTS

| | | | | |
|---|---|---|---|---|
| 2018/0031880 | A1* | 2/2018 | Kwak | G06F 3/0412 |
| 2019/0273124 | A1 | 9/2019 | Leng et al. | |
| 2020/0058710 | A1* | 2/2020 | Li | H10K 59/131 |
| 2022/0164047 | A1* | 5/2022 | Kim | G06F 3/0446 |

FOREIGN PATENT DOCUMENTS

| | | | |
|---|---|---|---|
| CN | 109062442 | A | 12/2018 |
| CN | 111240518 | A | 6/2020 |
| CN | 111261679 | A | 6/2020 |
| CN | 114138136 | A | 3/2022 |
| CN | 115877984 | A | 3/2023 |
| DE | 112021001307 | T5 | 1/2023 |
| WO | 2022205212 | A1 | 10/2022 |

* cited by examiner

TOUCH SUBSTRATE AND DISPLAY APPARATUS

CROSS REFERENCE TO RELATED APPLICATIONS

The present disclosure is a US National Stage of International Application No. PCT/CN2024/081487, filed on Mar. 13, 2024, which claims the priority from Chinese Patent Application No. 202310478673.7, filed with the China National Intellectual Property Administration on Apr. 28, 2023 and entitled "Touch Substrate and Display Apparatus", which is hereby incorporated by reference in its entirety.

TECHNICAL FIELD

The present disclosure relates to the field of display technology, in particular to a touch substrate and a display apparatus.

BACKGROUND

With the rapid development of the active-matrix organic light-emitting diode (AMLOED) display industry, display apparatuses are also developing towards narrow bezel, lightness and thinness. At present, these high demands can be met using a Flexible Multi Layer On Cell (FMLOC) technique. During the design of a display apparatus using the FMLOC technique, a touch structure layer is directly manufactured on a light-emitting structure layer and an encapsulation layer that are stacked, which can well make a product lighter and thinner.

In the FMLOC technique, touch signal lines (traces) are respectively connected from an edge of a display substrate to a first touch electrode in a display area to transmit and receive signals, and a touch function is achieved by a change in a capacitance value generated by a finger touching the first touch electrode in the display area. In the prior art, a trace of a foldable product is configured as a double-layer metal trace, with an inorganic layer disposed between the two layers of metal traces. However, when the foldable product is bent at a large angle, a crack appears in the inorganic layer and leads to peeling of the film layer, and the crack will extend to the trace, affecting the service life of the product.

SUMMARY

Embodiments of the present disclosure provide a touch substrate and a display apparatus.

Embodiments of the present disclosure provide a touch substrate. The touch substrate includes:

- a base, including a bending area and a non-bending area located beyond the bending area; where the bending area extends in a first direction; and
- a plurality of touch signal lines on a side of the base; where at least some of the touch signal lines extend to the bending area; each of the plurality of touch signal lines includes: a first touch signal sub-line and a second touch signal sub-line on a side of the first touch signal sub-line facing away from the base; and in the bending area, an orthographic projection of the first touch signal sub-line on the base is located with an orthographic projection of the second touch signal sub-line on the base.

In some embodiments, in the non-bending area, the orthographic projection of the first touch signal sub-line on the base substantially coincides with the orthographic projection of the second touch signal sub-line on the base.

In some embodiments, in the non-bending area, the orthographic projection of the first touch signal sub-line on the base is located in the orthographic projection of the second touch signal sub-line on the base.

In some embodiments, in the first direction, a difference between a width of the second touch signal sub-line and a width of the first touch signal sub-line in the non-bending area is smaller than a difference between a width of the second touch signal sub-line and a width of the first touch signal sub-line in the bending area.

In some embodiments, the touch substrate further includes a first insulating layer located between the first touch signal sub-line and the second touch signal sub-line;

- in the bending area, the first insulating layer includes first via holes corresponding to the touch signal lines one to one; and
- an orthographic projection of the first via hole on the base covers the orthographic projection of the first touch signal sub-line on the base in the bending area.

In some embodiments, in the bending area, in a same touch signal line, a distance in the first direction between an edge of the first touch signal sub-line and an edge of the second touch signal sub-line located on a same side is greater than or equal to 1.2 μm and less than or equal to 1.5 μm.

In some embodiments, the touch substrate further includes:

- a plurality of first touch electrodes, which are located on a same side of the base as the touch signal lines, extend in the first direction, and are arranged in a second direction; where the first direction intersects with the second direction; and
- a plurality of first connection leads, which are located on the same side of the base as the touch signal lines; where
- the plurality of touch signal lines include a plurality of first touch signal lines; first ends of at least some of the first touch signal lines are located in the bending area;
- at least one end of the first touch electrode in an extension direction thereof is electrically connected to the first touch signal line through the first connection lead; and in the bending area, the first connection lead is connected to the first end of the first touch signal line.

In some embodiments, a pattern of an orthographic projection of the first end on the base includes two first sides extending in the second direction and a second side connecting the two first sides; and an angle between an extension direction of the second side and the first direction is greater than 0 and less than 90°.

In some embodiments, an angle between an extension direction of the second side and the first direction is greater than or equal to 30° and less than and equal to 60°.

In some embodiments, the first connection lead is disposed in a same layer as the first touch signal sub-line, and the first end is an end of the first touch signal sub-line; or, the first connection lead is disposed in a same layer as the second touch signal sub-line, and the first end is an end of the second touch signal sub-line.

In some embodiments, the first end of the first touch signal line is an end of the second touch signal sub-line included in the first touch signal line;

- a pattern of an orthographic projection of the end of the second touch signal sub-line on the base includes two third sides extending in the second direction and a fourth side connecting the two third sides;

an extension direction of the second side is same as an extension direction of the fourth side; and an orthographic projection of the end of the second touch signal sub-line on the base covers the fourth side.

In some embodiments, in the bending area, at least some of the touch signal lines include portions extending in the third direction; and the angle between the third direction and the second direction is greater than 0 and less than or equal to 20°.

In some embodiments, in the non-bending area, at least some of the touch signal lines include portions extending in the third direction; and the angle between the third direction and the second direction is greater than 0 and less than or equal to 20°.

Embodiments of the present disclosure provide a touch substrate. The touch substrate includes:

a base, including a bending area and a non-bending area located beyond the bending area; where the bending area extends in a first direction; and a plurality of touch signal lines on a side of the base; where the plurality of touch signal lines include a plurality of first touch signal lines; first ends of at least some of the first touch signal lines are located in the bending area;

a plurality of first touch electrodes located on a same side of the base as the touch signal lines; where the plurality of first touch electrodes extend in the first direction, and are arranged in a second direction, and the second direction intersects with the first direction; and a plurality of first connection leads located on the same side of the base as the touch signal lines; where at least one end of the first touch electrode in an extension direction thereof is electrically connected to the first touch signal line through the first connection lead; in the bending area, the first connection lead is connected to the first end of the first touch signal line.

In some embodiments, a pattern of an orthographic projection of the first end on the base includes two first sides extending in the second direction and a second side connecting the two first sides;

and an angle between an extension direction of the second side and the first direction is greater than 0 and less than 90°.

In some embodiments, an angle between an extension direction of the second side and the first direction is greater than or equal to 30° and less than and equal to 60°.

In some embodiments, each of the plurality of touch signal lines includes: a first touch signal sub-line and a second touch signal sub-line on a side of the first touch signal sub-line facing away from the base;

where the first connection lead is disposed in a same layer as the first touch signal sub-line, and the first end is an end of the first touch signal sub-line; or, the first connection lead is disposed in a same layer as the second touch signal sub-line, and the first end is an end of the second touch signal sub-line.

In some embodiments, in the bending area, the orthographic projection of the first touch signal sub-line on the base is located in the orthographic projection of the second touch signal sub-line on the base.

In some embodiments, the first end is an end of the second touch signal sub-line;

a pattern of an orthographic projection of the end of the second touch signal sub-line on the base includes two third sides extending in the second direction and a fourth side connecting the two third sides;

an extension direction of the second side is same as an extension direction of the fourth side; and an orthographic projection of the end of the second touch signal sub-line on the base covers the fourth side.

In some embodiments, the touch substrate further includes a first insulating layer located between the first touch signal sub-line and the second touch signal sub-line;

in the bending area, the first insulating layer includes first via holes corresponding to the touch signal lines one to one; and an orthographic projection of the first via hole on the base covers the orthographic projection of the first touch signal sub-line on the base in the bending area.

In some embodiments, in the bending area, in a same touch signal line, a distance in the second direction between an edge of the first touch signal sub-line and an edge of the second touch signal sub-line located on a same side is greater than or equal to 1.2 μm and less than or equal to 1.5 μm; and the second direction is perpendicular to the first direction.

In some embodiments, an orthographic projection of the first touch signal sub-line on the base or an orthographic projection of the second touch signal sub-line does not overlap with the bending area.

In some embodiments, the touch substrate further includes a first insulating layer located between the first touch signal sub-line and the second touch signal sub-line; the first insulating layer includes: a plurality of second via holes; and on a side of the non-bending area close to the bending area, the second touch signal sub-line is electrically connected to the first touch signal sub-line through at least one of the second via holes.

In some embodiments, in the bending area, the orthographic projection of the first touch signal sub-line on the base substantially coincides with the orthographic projection of the second touch signal sub-line on the base;

the touch substrate further includes a first insulating layer located between the first touch signal sub-line and the second touch signal sub-line; in the bending area, the first insulating layer includes first via holes corresponding to the touch signal lines one to one; and an orthographic projection of the first via hole on the base covers the orthographic projection of the first touch signal sub-line on the base in the bending area.

In some embodiments, in the non-bending area, the orthographic projection of the first touch signal sub-line on the base substantially coincides with the orthographic projection of the second touch signal sub-line on the base.

In some embodiments, in the non-bending area, the orthographic projection of the first touch signal sub-line on the base is located in the orthographic projection of the second touch signal sub-line on the base.

In some embodiments, in the bending area, at least some of the touch signal lines include portions extending in the third direction; and the angle between the third direction and the second direction is greater than 0 and less than or equal to 20°.

In some embodiments, in the non-bending area, at least some of the touch signal lines include portions extending in the third direction; and the angle between the third direction and the second direction is greater than 0 and less than or equal to 20°.

Embodiments of the present disclosure provide a touch substrate. The touch substrate includes:

a base, including a bending area and a non-bending area located beyond the bending area; where the bending area extends in a first direction; and a plurality of touch signal lines on a side of the base; where at least some of the touch signal lines extend to the bending area; in the bending area, at least some of the touch signal lines include portions extending in a third direction; and an angle between the third direction and a second direction is greater than 0 and less than or equal to 20°.

In some embodiments, in the non-bending area, at least some of the touch signal lines include portions extending in the third direction; and the angle between the third direction and the second direction is greater than 0 and less than or equal to 20°.

In some embodiments, each of the plurality of touch signal lines includes: a first touch signal sub-line and a second touch signal sub-line on a side of the first touch signal sub-line facing away from the base; and in the bending area, the orthographic projection of the first touch signal sub-line on the base is located in the orthographic projection of the second touch signal sub-line on the base.

In some embodiments, the touch substrate further includes a first insulating layer located between the first touch signal sub-line and the second touch signal sub-line;

in the bending area, the first insulating layer includes first via holes corresponding to the touch signal lines one to one; and an orthographic projection of the first via hole on the base covers the orthographic projection of the first touch signal sub-line on the base in the bending area.

In some embodiments, in the bending area, in a same touch signal line, a distance in the second direction between an edge of the first touch signal sub-line and an edge of the second touch signal sub-line located on a same side is greater than or equal to 1.2 μm and less than or equal to 1.5 μm; and the second direction is perpendicular to the first direction.

In some embodiments, each of the plurality of touch signal lines includes: a first touch signal sub-line and a second touch signal sub-line on a side of the first touch signal sub-line facing away from the base; and an orthographic projection of the first touch signal sub-line or the second touch signal sub-line on the base does not overlap with the bending area.

In some embodiments, the touch substrate further includes a first insulating layer located between the first touch signal sub-line and the second touch signal sub-line; the first insulating layer includes: a plurality of second via holes; and on a side of the non-bending area close to the bending area, the second touch signal sub-line is electrically connected to the first touch signal sub-line through at least one of the second via holes.

In some embodiments, each of the plurality of touch signal lines includes: a first touch signal sub-line and a second touch signal sub-line on a side of the first touch signal sub-line facing away from the base;

in the bending area, the orthographic projection of the first touch signal sub-line on the base substantially coincides with the orthographic projection of the second touch signal sub-line on the base;

the touch substrate further includes a first insulating layer located between the first touch signal sub-line and the second touch signal sub-line;

in the bending area, the first insulating layer includes first via holes corresponding to the touch signal lines one to one; and an orthographic projection of the first via hole on the base covers the orthographic projection of the first touch signal sub-line on the base in the bending area.

In some embodiments, in the non-bending area, the orthographic projection of the first touch signal sub-line on the base substantially coincides with the orthographic projection of the second touch signal sub-line on the base.

In some embodiments, in the non-bending area, the orthographic projection of the first touch signal sub-line on the base is located in the orthographic projection of the second touch signal sub-line on the base.

In some embodiments, the touch substrate further includes:

a plurality of first touch electrodes located on a same side of the base as the touch signal lines; where the plurality of first touch electrodes extend in the first direction, and are arranged in the second direction; and a plurality of first connection leads located on the same side of the base as the touch signal lines; where at least one end of the first touch electrode in an extension direction thereof is electrically connected to the first touch signal line through the first connection lead; in the bending area, the first connection lead is connected to the first end of the first touch signal line.

In some embodiments, a pattern of an orthographic projection of the first end on the base includes two first sides extending in the second direction and a second side connecting the two first sides; and an angle between an extension direction of the second side and the first direction is greater than 0 and less than 90°.

In some embodiments, the angle between an extension direction of the second side and the first direction is greater than or equal to 30° and less than and equal to 60°.

In some embodiments, the touch signal line includes a first touch signal sub-line and a second touch signal sub-line; where the first connection lead is disposed in a same layer as the first touch signal sub-line, and the first end is an end of the first touch signal sub-line; or, the first connection lead is disposed in a same layer as the second touch signal sub-line, and the first end is an end of the second touch signal sub-line.

In some embodiments, the first end is an end of the second touch signal sub-line;

a pattern of an orthographic projection of the end of the second touch signal sub-line on the base includes two third sides extending in the second direction and a fourth side connecting the two third sides; an extension direction of the second side is same as an extension direction of the fourth side; and an orthographic projection of the end of the second touch signal sub-line on the base covers the fourth side.

Embodiments of the present disclosure provide a display apparatus. The display apparatus includes:

a touch substrate according to the embodiments of the present disclosure;

a display substrate; where the touch substrate is located on a light-emitting side of a flexible display substrate; the display substrate includes a display area; and orthographic projections of the bending area and the non-bending area on the display substrate overlap with the display area.

BRIEF DESCRIPTION OF FIGURES

In order to illustrate the technical solutions in the embodiments of the present disclosure more clearly, drawings required for description of the embodiments will be briefly described below. Apparently, the drawings in the following description are merely some embodiments of the present disclosure, and those skilled in the art can derive other drawings from these drawings without creative efforts.

Figure 1:
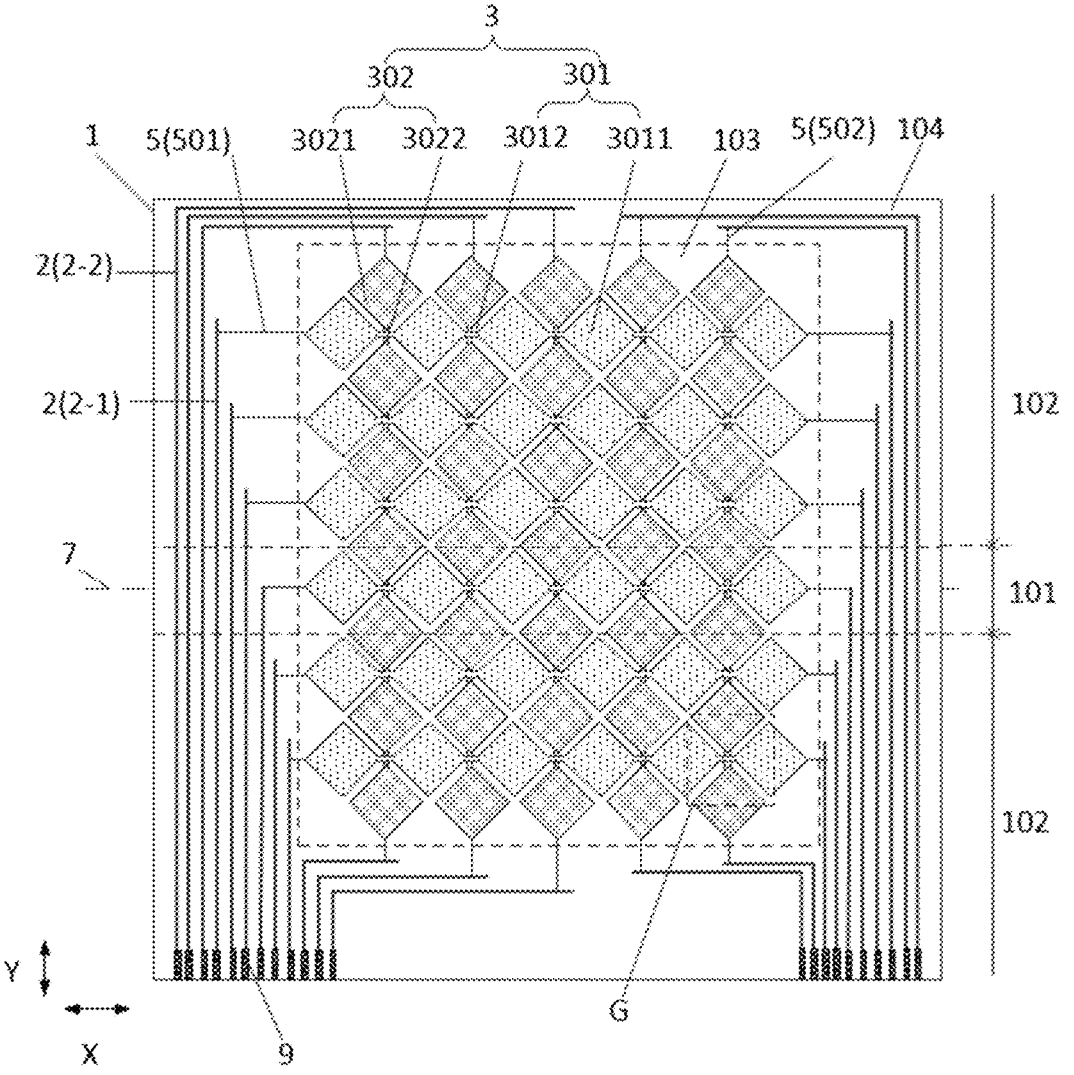
FIG. 1 is a schematic structural diagram of a touch substrate according to an embodiment of the present disclosure.

Reference signs: base 1, bending area 101, non-bending area 102, touch area 103, peripheral area 104, first direction X, second direction Y, third direction X', touch signal line 2, first touch signal sub-line 201, second touch signal sub-line 202, first touch signal line 2-1, second touch signal line 2-2, touch electrode 3, first touch electrode 301, second touch electrode 302, first electrode block 3011, first connection portion 3012, second electrode block 3021, second connection portion 3022, first end 4, connection lead 5, first connection lead 501, second connection lead 502, bending axis 7, first insulating layer 8, first via hole 801, second via hole 802, pad electrode 9, first side 10, second side 11, third side 12, fourth side 13, metal mesh structure 14, metal line 15, touch substrate 16, display substrate 17, flexible base substrate 1701, display layer 1702, pixel driving circuit 17021, electroluminescent device 17022, thin film transistor TFT, active layer 170211, gate G, source S, drain D, buffer layer 1704, gate insulating layer 1705, interlayer insulating layer 1706, planarization layer 1707, pixel definition layer 1708, anode 170221, light-emitting functional layer 170222, cathode 170222, encapsulation layer 1703, inorganic encapsulation layer 17031, organic encapsulation layer 17032, protective layer 18.

DETAILED DESCRIPTION

In order to make the objectives, technical solutions, and advantages of embodiments of the present disclosure clearer, the technical solutions in the embodiments of the present disclosure will be clearly and completely described below with reference to the drawings in the embodiments of the present disclosure. Apparently, the described embodiments are some, not all, of the embodiments of the present disclosure. The embodiments in the present disclosure and the features in the embodiments may be combined with each other without conflict. All other embodiments obtained by those skilled in the art based on the embodiments of the present disclosure without creative efforts shall fall within the scope of protection of the present disclosure.

Unless otherwise indicated, the technical or scientific terms used in the present disclosure shall have the usual meanings understood by a person of ordinary skill in the art to which the present disclosure belongs. The words “first”, “second” and the like used in the present disclosure do not indicate any order, quantity or importance, but are only used to distinguish different components. The words “including” or “containing” and the like, mean that an element or item preceding the word covers an element or item listed after the word and the equivalent thereof, without excluding other elements or items. The word "connection" or "coupling" and the like are not restricted to physical or mechanical connection, but may include electrical connection, whether direct or indirect.

It should be noted that sizes and shapes of all Figures in the drawings do not reflect a true scale and are only intended to illustrate the contents of the present disclosure. Same or similar reference signs indicate same or similar elements or elements with the same or similar function throughout the present disclosure.

Figure 2:
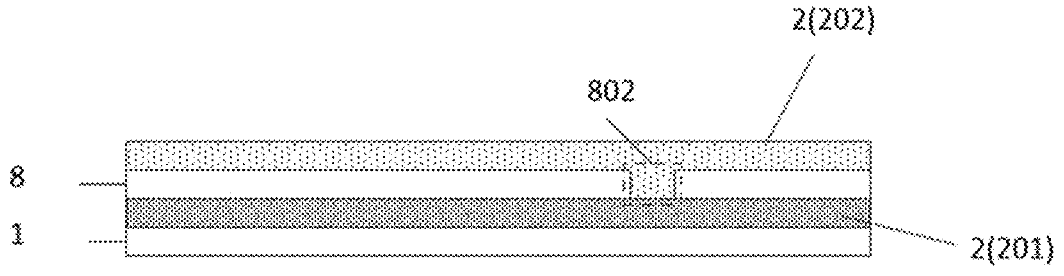
FIG. 2 is a schematic structural diagram of another touch substrate according to an embodiment of the present disclosure.

Embodiments of the present disclosure provide a touch substrate. As shown in FIG. 1, the touch substrate includes:

- a base 1, including a bending area 101 and a non-bending area 102 located beyond the bending area 101; where the bending area 101 extends in a first direction X; and
- a plurality of touch signal lines 2 on a side of the base 1; where, as shown in FIG. 2, each of the plurality of touch signal lines 2 includes: a first touch signal sub-line 201 and a second touch signal sub-line 202 on a side of the first touch signal sub-line 201 facing away from the base 1;
- a plurality of touch electrodes 3 on a same side of the base 1 as the touch signal lines 2; and
- a plurality of connection leads 5 on a same side of the base 1 as the touch signal lines 2; where the touch electrodes 3 are electrically connected to the touch signal lines 2 through the connection leads 5; at least one end of the touch electrode 3 in an extension direction thereof is electrically connected to the touch signal line 2 through the connection lead 5.

In an implementation, as shown in FIG. 1, the touch substrate is divided into a touch area 103 and a peripheral area 104 located beyond the touch area 103; the bending area 101 includes both a portion located in the touch area 103 and a portion located in the peripheral area 104, and the bending area 101 extends from the peripheral area 104 on one side through the touch area 103 to the peripheral area 104 on the other side. Referring to FIG. 1, description is made based on an example that the touch substrate includes two non-bending areas 102 located on both sides of the bending area 101 in the second direction Y. Herein, the second direction Y intersects with the first direction X, and in FIG. 1, the second direction Y is perpendicular to the first direction X. In some embodiments, the touch substrate has a bending axis 7, and the touch substrate in use may be bent along the bending axis. For example, the bending axis 7 is a symmetry axis of the touch substrate in the first direction X, and the bending axis 7 is also a symmetry axis of the bending area in the first direction X.

In some embodiments, in the second direction Y, a distance from an edge of the bending area parallel to the first direction X to the bending axis is about 15 mm to 16 mm. The width of the bending area in the second direction Y is about 30 mm.

In a specific implementation, as shown in FIG. 1, the touch electrode 3 is in the touch area 103, and includes a plurality of first touch electrodes 301 and a plurality of second touch electrodes 302; each of the first touch electrodes 301 extends in the first direction X, the plurality of first touch electrodes 301 are arranged in the second direction Y, each of the second touch electrodes 302 extends in the second direction Y, and the plurality of second touch electrodes 302 are arranged in the first direction X.

It should be noted that, as shown in FIG. 1, the touch substrate further includes a pad electrode 9. In a specific implementation, each touch signal line 2 in the peripheral area 104 is connected to a driver through the pad electrode 9, the driver applies a drive signal to the second touch electrode 302 through the touch signal line 2, and receives an output signal from the first touch electrode 301, or, the driver may apply the drive signal to the first touch electrode 301, and receive an output signal from the second touch electrode 302. The driver may determine a position where a touch occurs by detecting induction signals generated in a plurality of electrodes when different electrodes transmit touch signals. In some embodiments, the first touch electrode may be a driving electrode (Tx), and the second touch electrode may be an induction electrode (Rx), or, the first touch electrode may be an induction electrode (Rx), and the second touch electrode may be a driving electrode (Tx).

In some embodiments, as shown in FIG. 1, the first touch electrode 301 may be divided into a plurality of first electrode blocks 3011 arranged in the first direction X, two adjacent first electrode blocks 3011 in the same first touch electrode 301 are electrically connected through a first connection portion 3012, the second touch electrode 302 may be divided into a plurality of second electrode blocks 3021 arranged in the second direction Y, and two adjacent second electrode blocks 3021 in the same second touch electrode 302 are electrically connected through a second connection portion 3022. In a specific implementation, the first electrode block 3011 and the second electrode block 3021 may be disposed in a same layer, one of the first connection portion 3012 and the second connection portion 3022 may be disposed in a same layer as the first electrode block 3011 and the second electrode block 3021, and the other one of the first connection portion 3012 and the second connection portion 3022 may be disposed in a different layer from the first electrode block 3011 and the second electrode block 3021. It should be noted that, the first touch electrode and the second touch electrode form a touch structure, and as shown in FIG. 1, the G area may be regarded as a repeating unit of the touch structure.

It should be noted that, the connection lead 5 is represented by a line segment in FIG. 1, which is only intended to simply illustrate a connection relationship among the touch signal line, the connection lead and the touch electrode. Moreover, referring to FIG. 1, description is made only based on an example that the touch electrode is in the shape of a rhombus. In a specific implementation, the touch electrode and the connection lead may be disposed in other forms.

In some embodiments, as shown in FIG. 2, the touch substrate further includes a first insulating layer 8 located between the first touch signal sub-line 201 and the second touch signal sub-line 202.

In the related art, in each touch signal line, an orthographic projection of the first touch signal sub-line on the base coincides with an orthographic projection of the second touch signal sub-line on the base, that is, in the first direction, a line width of the first touch signal sub-line is equal to a line width of the second touch signal sub-line. When the touch substrate is bent along the bending axis, in the bending area, a crack is prone to appear in the first insulating layer, and the crack is prone to extend to the first touch signal sub-line, affecting the transmission of a touch signal, and further affecting the service life of the touch substrate.

Implementation Scheme 1

Figure 3:
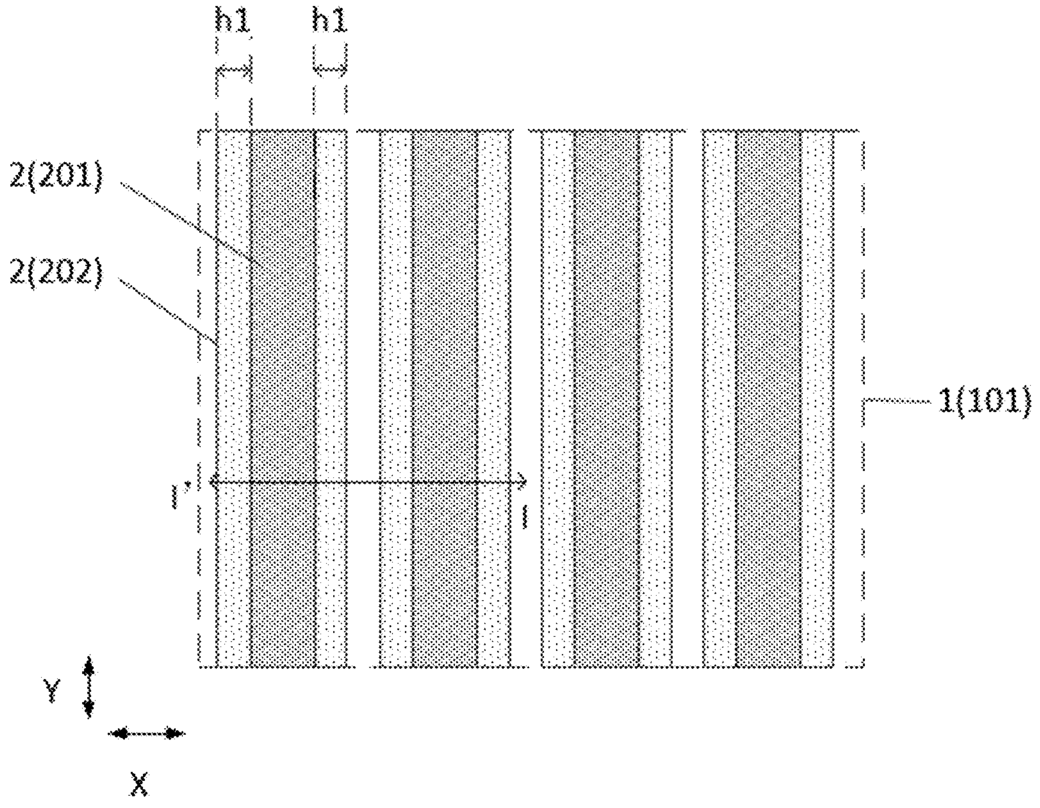
FIG. 3 is a schematic structural diagram of still another touch substrate according to an embodiment of the present disclosure.

Embodiments of the present disclosure provide a touch substrate, as shown in FIG. 3, in the bending area 101, the orthographic projection of the first touch signal sub-line 201 on the base 1 is located in the orthographic projection of the second touch signal sub-line 202 on the base 1.

In the touch substrate according to the embodiments of the present disclosure, in the bending area, the orthographic projection of the first touch signal sub-line on the base is located in the orthographic projection of the second touch signal sub-line on the base. That is, in the bending area, a line width in the first direction of the first touch signal sub-line in a lower layer is smaller than a line width of the second touch signal sub-line in an upper layer. Such a setting is more conducive to the bending of the touch substrate along the bending axis. In addition, in the bending area, the orthographic projection of the first touch signal sub-line on the base is located in the orthographic projection of the second touch signal sub-line on the base, that is, in the bending area, the orthographic projection of the second touch signal sub-line on the base covers the orthographic projection of the first touch signal sub-line on the base. Accordingly, a portion of the first insulating layer covering the edge of the first touch signal sub-line is covered by the orthographic projection of the second touch signal sub-line on the base. Therefore, in the case of bending at a large angle, a crack can be prevented from appearing in the insulating layer between the first touch signal sub-line and the second touch signal sub-line, and further the crack can be prevented from extending to the first touch signal sub-line, thereby improving the yield of the product and prolonging the service life of the touch substrate.

It should be noted that, in order to clearly show the projection relationship between the first touch signal sub-line and the second touch signal sub-line, in FIG. 3 the first touch signal sub-line 201 is disposed in the upper layer for display.

In some embodiments, as shown in FIG. 3, in the bending area 101, in a same touch signal line 2, a distance h1 in the first direction between an edge of the first touch signal sub-line 201 and an edge of the second touch signal sub-line 202 located on a same side is greater than 0.

Thus, it can be ensured that the orthographic projection of the second touch signal sub-line on the base completely covers the orthographic projection of the first touch signal sub-line on the base, and accordingly, portions of the first insulating layer covering the edges on both sides of the first touch signal sub-line are covered by the orthographic projection of the second touch signal sub-line on the base, thereby preventing a crack from appearing in the first insulating layer, and further preventing the crack from extending to the first touch signal sub-line.

In a specific implementation, for example, h1 is greater than or equal to 1.2 μm and less than or equal to 1.5 μm. In order to ensure that within a process error range of the manufacture of the touch substrate, the orthographic projection of the second touch signal sub-line on the base completely covers the orthographic projection of the first touch signal sub-line on the base, h1 is, for example, 1.2 μm.

Figure 4:
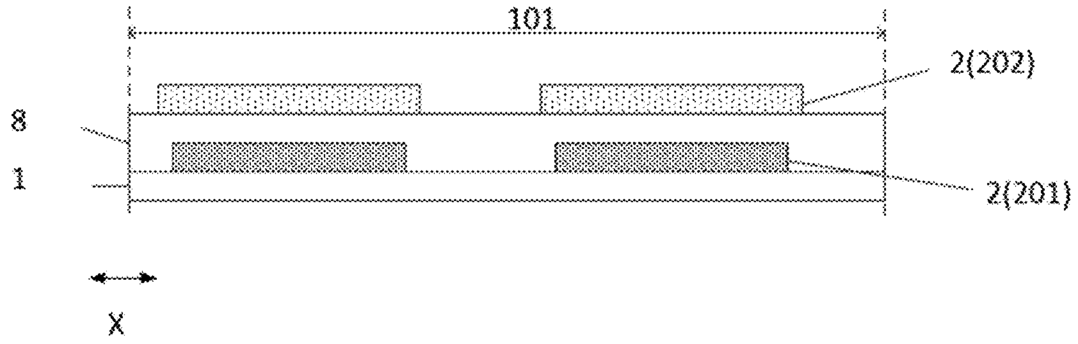
FIG. 4 is a cross-sectional view along II' of FIG. 3 according to an embodiment of the present disclosure.

In some embodiments, a cross-sectional view along II' of FIG. 3 is shown in FIG. 4. In the bending area 101, the orthographic projection of the first insulating layer 8 on the base 1 covers the orthographic projection of the first touch signal sub-line 201 on the base 1, and the first touch signal sub-line 201 is insulated from the second touch signal sub-line 202 by the first insulating layer 8.

Figure 5:
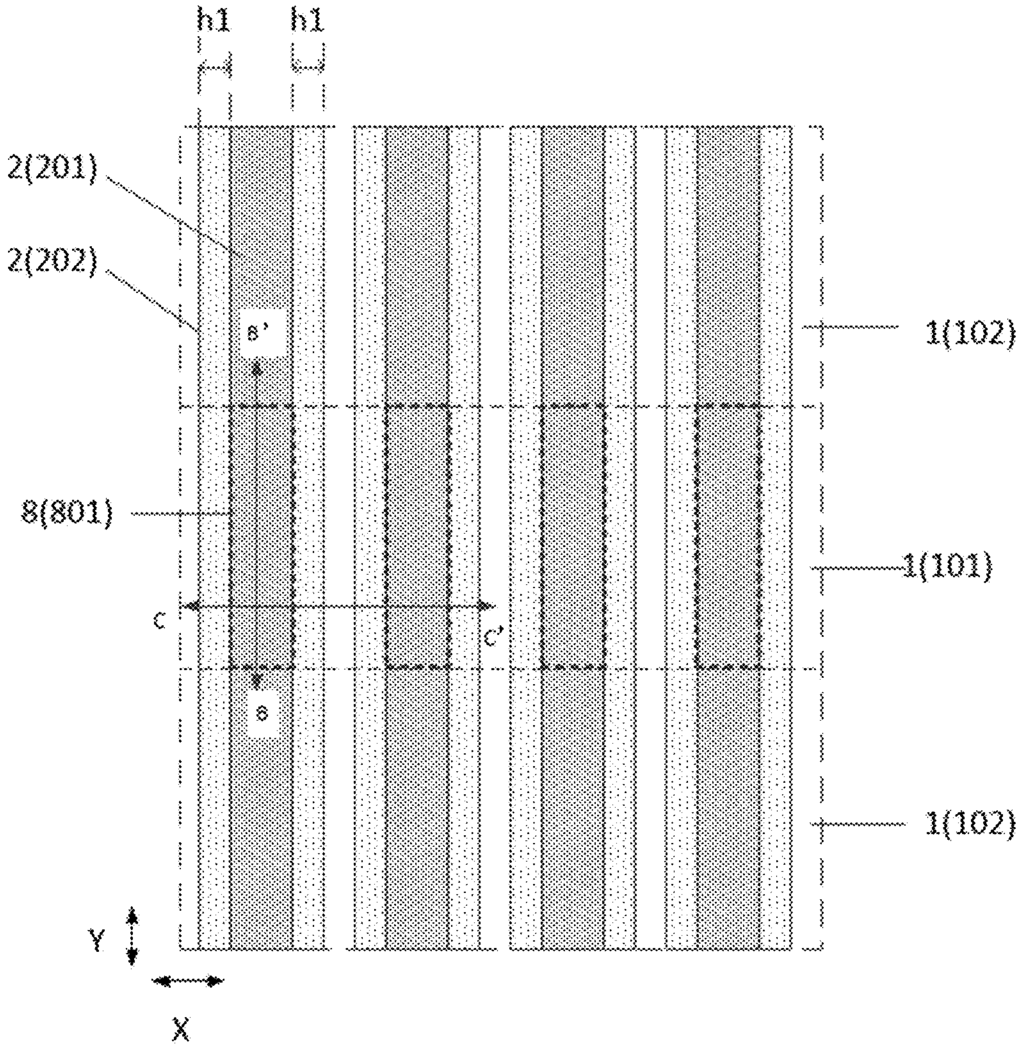
FIG. 5 is a schematic structural diagram of still another touch substrate according to an embodiment of the present disclosure.
Figure 6:
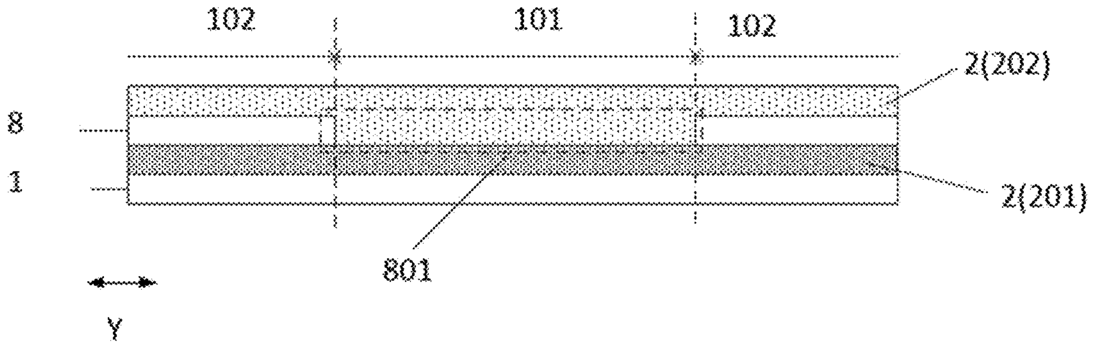
FIG. 6 is a cross-sectional view along BB' of FIG. 5 according to an embodiment of the present disclosure.
Figure 7:
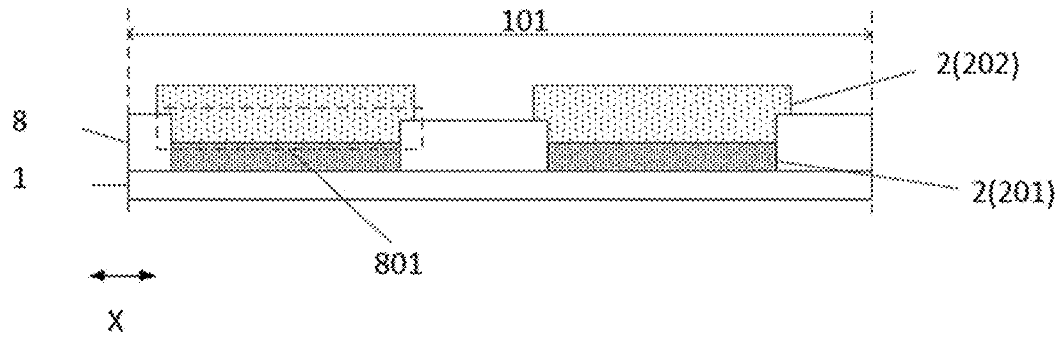
FIG. 7 is a cross-sectional view along CC' of FIG. 5 according to an embodiment of the present disclosure.

Alternatively, in some embodiments, as shown in FIG. 5 to FIG. 7, in the bending area 101, the first insulating layer 8 includes first via holes 801 corresponding to the touch signal lines 2 one to one; and an orthographic projection of the first via hole 801 on the base 1 covers the orthographic projection of the first touch signal sub-line 201 on the base 1 in the bending area 101.

It should be noted that, FIG. 6 is a cross-sectional view along BB' of FIG. 5, and FIG. 7 is a cross-sectional view along CC' of FIG. 5.

That is, the first insulating layer between the first touch signal sub-line and the second touch signal sub-line in the bending area is removed, and the second touch sub-line is directly in contact with the first touch sub-line in the bending area. Moreover, the orthographic projection of the first via hole on the base covers the orthographic projection of the first touch signal sub-line on the base in the bending area, and the first insulating layer between adjacent touch signal lines is retained. The first insulating layer between adjacent touch signal lines may act as a retaining wall to prevent the extension of a crack, improve the yield of the product, and prolong the service life of the touch substrate.

In some embodiments, the orthographic projection of the first via hole on the base substantially coincides with the orthographic projection of the first touch signal sub-line on the base in the bending area, or, the orthographic projection of the first touch signal sub-line on the base in the bending area is located in the orthographic projection of the first via hole on the base.

It should be noted that, that the orthographic projection of the first via hole on the base substantially coincides with the orthographic projection of the first touch signal sub-line on the base in the bending area refers to that: due to a process error during the manufacture of the touch substrate, there may be a deviation between the orthographic projection of the first via hole on the base and the orthographic projection of the first touch signal sub-line on the base. Therefore, as long as a distance between an edge of the orthographic projection of the first via hole on the base and an edge of the orthographic projection of the first touch signal sub-line on the base is within a reasonable process error range, it can be deemed that the orthographic projection of the first via hole on the base substantially coincides with the orthographic projection of the first touch signal sub-line on the base. For example, if the distance between the edge of the orthographic projection of the first via hole on the base and the edge of the orthographic projection of the first touch signal sub-line on the base is less than or equal to 0.8 μm, it can be deemed that the orthographic projection of the first via hole on the base substantially coincides with the orthographic projection of the first touch signal sub-line on the base.

Figure 8:
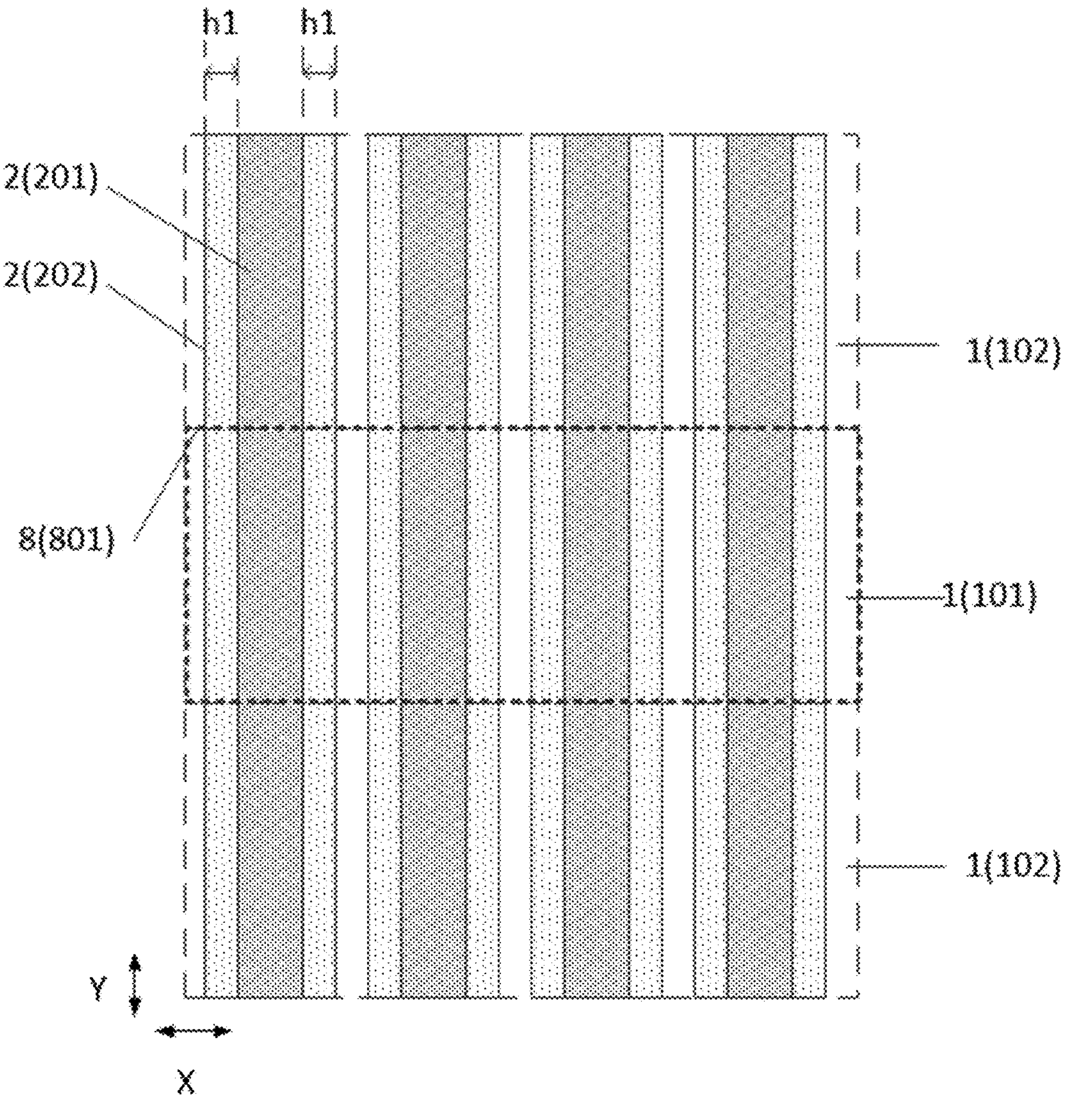
FIG. 8 is a schematic structural diagram of still another touch substrate according to an embodiment of the present disclosure.

Of course, in some embodiments, in the bending area on the side of the touch area, as shown in FIG. 8, the first insulating layer 8 includes only one first via hole 801, and an orthographic projection of the first via hole 801 on the base 1 covers orthographic projections of a plurality of first touch signal sub-lines 201 on the base 1. That is, in a specific implementation, the first insulating layer is completely removed from the bending area on the side of the touch area. In this way, a crack is prevented from appearing in and extending from the first insulating layer in the bending area.

It should be noted that, as shown in FIG. 2, the first insulating layer 8 also includes a plurality of second via holes 802; in each touch signal line 2, the first touch signal sub-line 201 is electrically connected to the second touch signal sub-line 202 through the second via hole 802.

Figure 9:
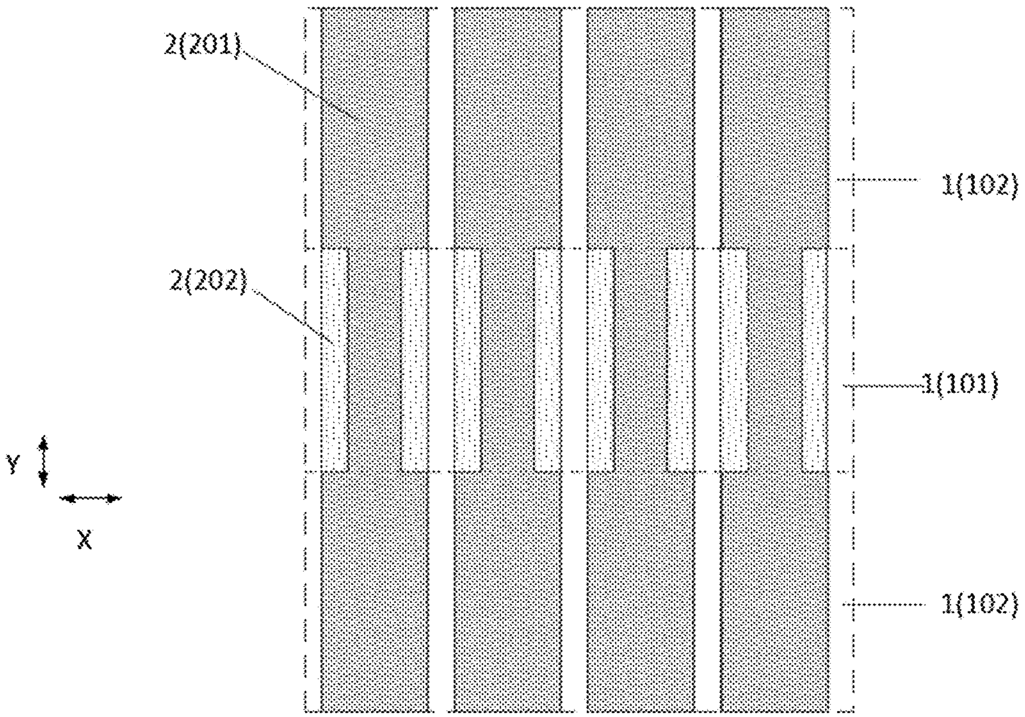
FIG. 9 is a schematic structural diagram of still another touch substrate according to an embodiment of the present disclosure.

In some embodiments, as shown in FIG. 9, in the non-bending area 102, the orthographic projection of the first touch signal sub-line 201 on the base 1 substantially coincides with the orthographic projection of the second touch signal sub-line 202 on the base 1.

It should be noted that, due to a process error during the manufacture of the touch substrate, there may be a deviation between the orthographic projection of the first touch signal sub-line on the base and the orthographic projection of the second touch signal sub-line on the base. Therefore, as long as a distance between an edge of the orthographic projection of the first touch signal sub-line on the base and an edge of the orthographic projection of the second touch signal sub-line on the base is within a reasonable process error range, it can be deemed that the orthographic projection of the first touch signal sub-line on the base substantially coincides with the orthographic projection of the second touch signal sub-line on the base. For example, if the distance between the edge of the orthographic projection of the first touch signal sub-line on the base and the edge of the orthographic projection of the second touch signal sub-line on the base is less than or equal to 0.8 μm, it can be deemed that the orthographic projection of the first touch signal sub-line on the base substantially coincides with the orthographic projection of the second touch signal sub-line on the base.

In some embodiments, as shown in FIG. 9, for at least some of the plurality of touch signal lines 2, in the first direction X, a line width of the first touch signal sub-line 201 in the bending area 101 is smaller than a line width thereof in the non-bending area 102, and a line width of the second touch signal sub-line 202 in the bending area 101 is equal to a line width thereof in the non-bending area 102.

Figure 10:
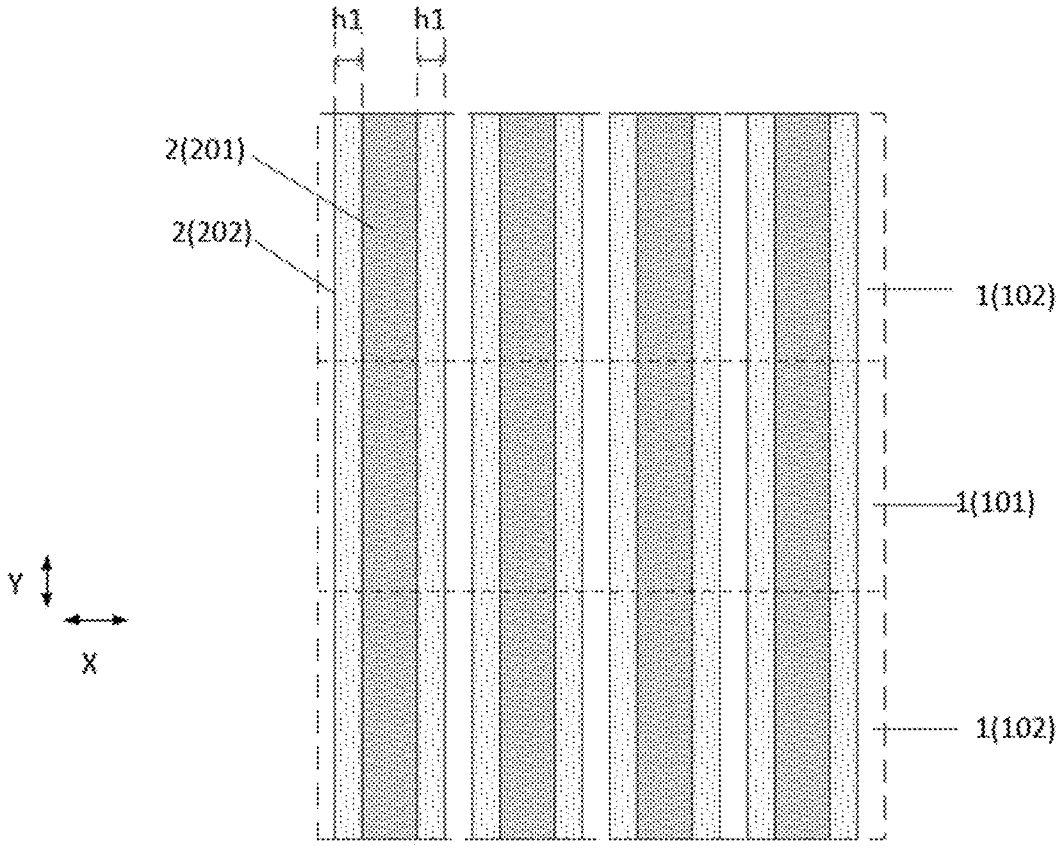
FIG. 10 is a schematic structural diagram of still another touch substrate according to an embodiment of the present disclosure.

Alternatively, in some embodiments, as shown in FIG. 5 and FIG. 10, in the non-bending area 102, the orthographic projection of the first touch signal sub-line 201 on the base 1 is located in the orthographic projection of the second touch signal sub-line 202 on the base 1.

That is, in the non-bending area, the line width in the first direction of the first touch signal sub-line in a lower layer is smaller than the line width of the second touch signal sub-line in an upper layer.

In some embodiments, as shown in FIG. 10, for at least some of the plurality of touch signal lines 2, in the first direction X, the line width of the first touch signal sub-line 201 in the bending area 101 is equal to the line width thereof in the non-bending area 102, and the line width of the second touch signal sub-line 202 in the bending area 101 is equal to the line width thereof in the non-bending area 102.

Alternatively, in some embodiments, the line width of the first touch signal sub-line in the bending area is not equal to the line width thereof in the non-bending area, and/or the line width of the second touch signal sub-line in the bending area is not equal to the line width thereof in the non-bending area.

In some embodiments, in the first direction, a difference between a width of the second touch signal sub-line and a width of the first touch signal sub-line in the non-bending area is smaller than a difference between a width of the second touch signal sub-line and a width of the first touch signal sub-line in the bending area.

It should be noted that, in order to clearly show the projection relationship between the first touch signal sub-line and the second touch signal sub-line, in FIG. 5, FIG. 9 and FIG. 10, the first touch signal sub-line 201 is also disposed in the upper layer for display.

It should be noted that, in FIG. 3, FIG. 5, FIG. 9 and FIG. 10, the line widths of the plurality of touch signal lines 2 in the first direction X are equal, and in the parts shown in FIG. 3, FIG. 5, FIG. 9 and FIG. 10, the line widths at different positions of each touch signal line 2 in the first direction X are equal.

In a specific implementation, as shown in FIG. 1, different touch signal lines 2 have different lengths. If the line widths of different touch signal lines in the first direction are equal, the plurality of touch signal lines may have different resistances, affecting the accuracy of the transmission of touch signals. Therefore, in a specific implementation, the line widths of the plurality of touch signal lines in the first direction X may also be set not completely equal, so as to compensate for a resistance of a touch signal line by changing the line width of the touch signal line, and reduce a resistance difference among different touch signal lines. In a specific implementation, among the plurality of touch signal lines, the length of a touch signal line on an outer side is greater than the length of a touch signal line on an inner side (i.e., the side close to the touch area), and thus the line width in the first direction of a touch signal line close to the touch area may be set smaller than the line width in the first direction of a touch signal line far away from the touch area.

In a specific implementation, as shown in FIG. 1, in the second direction Y, the farther away from the pad electrode 9, the smaller the quantity of touch signal lines 2 in the peripheral area, that is, a touch signal line 2 in the peripheral area farther away from the pad electrode 9 has a larger wiring space. Therefore, with a sufficient wiring space, the line widths in the first direction of the same touch signal line may be set not completely the same in different areas. For example, the line width in the first direction of a touch signal line in an area with a larger wiring space is greater than the line width in the first direction of the touch signal line in an area with a smaller wiring space.

The touch substrate as shown in FIG. 3 to FIG. 10 according to the embodiments of the present disclosure is described based on an example that in the bending area, the line width in the first direction of the first touch signal sub-line in a lower layer is smaller than the line width of the second touch signal sub-line in an upper layer to prevent a crack from appearing in the first insulating layer. Of course, there are other factors that cause cracks in the bending area.

Figure 11:
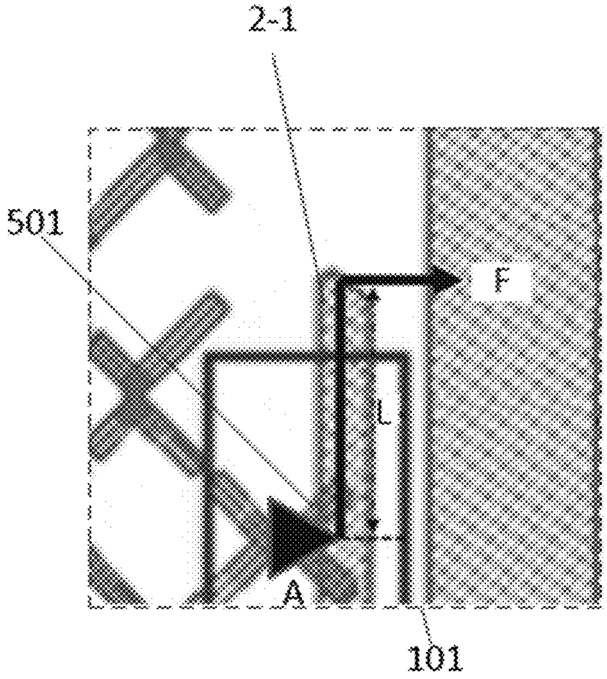
FIG. 11 is a schematic structural diagram of a touch substrate according to the related art.

In the related art, as shown in FIG. 11, the first connection lead is connected to the first touch signal line, and there is a distance L between a connection A and an end of the first touch signal line. Since the first touch signal line receives a force during the bending or folding process, there is a moment with point A as the fulcrum, and a micro moment M=F×L, where F is the force received by the first touch signal line during the bending process. Due to the presence of the micro moment M, when the bending angle is excessively large, a crack is prone to appear at the fulcrum A of the first insulating layer and extend to the touch signal line.

Implementation Scheme 2

Figure 12:
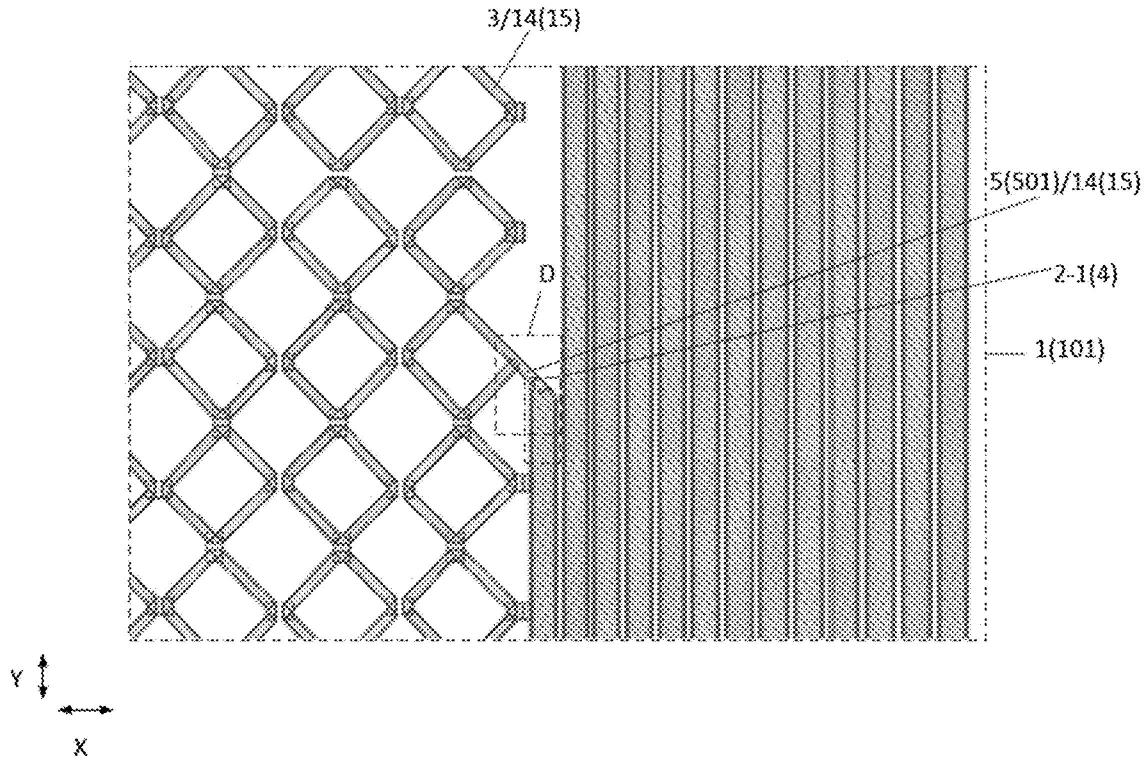
FIG. 12 is a schematic structural diagram of still another touch substrate according to an embodiment of the present disclosure.

In the touch substrate according to the embodiments of the present disclosure, as shown in FIG. 12, first ends 4 of at least some of first touch signal lines 2-1 are located in the bending area 101;

a plurality of touch electrodes 3 include a plurality of first control electrodes 301;

a plurality of connection leads 5 include a plurality of first connection leads 501; and at least one end of the first touch electrode 301 in an extension direction thereof is electrically connected to the first touch signal line 2-1 through the first connection lead 501; and in the bending area 101, the first connection lead 501 is connected to the first end 4 of the first touch signal line 2-1.

In the touch substrate according to the embodiments of the present disclosure, since in the bending area, the first connection lead is connected to the first end of the first touch signal line, the connection between the first connection lead and the first touch signal line and the first end of the first touch signal line have a moment of 0, which can prevent a crack from appearing in the first insulating layer in an area corresponding to the connection between the first connection lead and the first touch signal line and extending to the first touch signal line, when the bending angle of the bending area is excessively large.

In some embodiments, as shown in FIG. 12, the touch electrode 3 and the connection lead 5 each include a metal mesh structure 14.

In a specific implementation, the metal mesh structure connected to the touch signal line is integrally connected with the metal mesh structure of the touch electrode, that is, the touch electrode and the connection lead form an integral structure, and the portion of the metal mesh structure connected to the touch signal line can be referred to as a connection lead.

In a specific implementation, for example, the connection lead, the first electrode block, the second electrode block, and the first connection portion are disposed in a same layer, and the second connection portion is disposed in a different layer from the connection lead, the first electrode block, the second electrode block, and the first connection portion.

Figure 14:
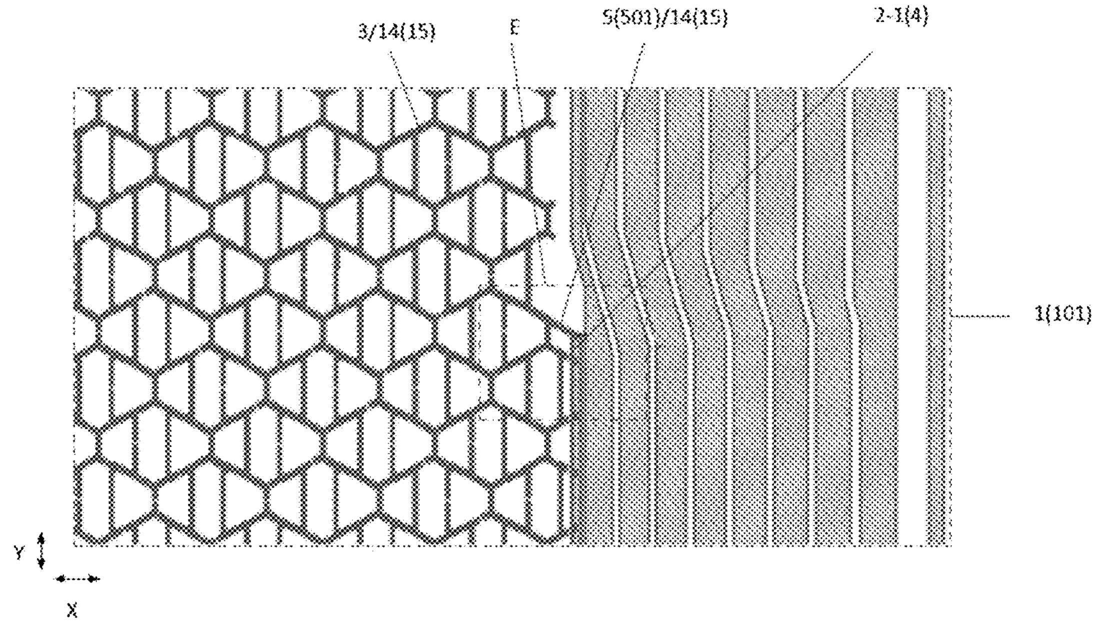
FIG. 14 is a schematic structural diagram of still another touch substrate according to an embodiment of the present disclosure.

In a specific implementation, the metal mesh structure is formed by interweaving a plurality of metal lines, the metal mesh structure includes a plurality of mesh patterns, the mesh pattern is a polygon formed by a plurality of metal lines, in other words, the metal mesh is formed by repeatedly and continuously disposing and splicing the mesh patterns. The shape of the mesh pattern enclosed by the metal lines may be a rhombus. Alternatively, the shape of the mesh pattern enclosed by the metal lines may be a triangle, or, as shown in FIG. 12, the shape of the mesh pattern enclosed by the metal lines may be a rectangle, or the shape of the mesh pattern enclosed by the metal lines may be a hexagon, or the shape of the mesh pattern enclosed by the metal lines may be a combination of multiple shapes, such as a combination of a pentagon and a hexagons, or the shape of the mesh pattern enclosed by the metal lines may include any one or more of a triangle, a square, a rectangle, a rhombus, a trapezoid, a pentagon, and a hexagon. As shown in FIG. 14, the outer contour of the shape of the mesh pattern enclosed by the metal lines is a hexagon, and the hexagonal contour is composed of a hexagonal pattern and trapezoidal patterns on both sides of the hexagonal pattern. In a specific implementation, the mesh pattern enclosed by the metal lines may be a regular shape or an irregular shape, and the edges of the mesh pattern may be straight lines or curves, which are not limited here in the embodiments of the present disclosure.

In a specific implementation, a plurality of cutouts may be provided on the metal mesh, so as to isolate a mesh pattern of the first touch electrode from a mesh pattern of the second touch electrode, when the mesh pattern of the first touch electrode and the mesh pattern of the second touch electrode are disposed in the same layer.

The touch electrode and the connection lead according to the embodiments of the present disclosure include a metal mesh structure. The first touch electrode, the second touch electrode and the connection lead in the form of a metal mesh structure have the advantages of low resistance, small thickness and fast reaction speed. The sensitivity and the accuracy of touch recognition can be improved.

In a specific implementation, a shape and a size of a mesh in the metal mesh structure of the touch electrode may be consistent with the shape and the size of the mesh in the metal mesh structure of the connection lead.

In a specific implementation, when the metal mesh structure is connected to the touch signal line, the touch signal line is connected to at least one metal line. Referring to FIG. 12 and FIG. 14, description is made based on an example that a first touch signal line 2-1 is connected to a plurality of metal lines 15. In a specific implementation, when the first touch signal line 2-1 is connected to a plurality of metal lines 15, a metal line 15 included in the first connection lead 5 is connected to a first end 4 of a first touch signal line 2-1, and it may be deemed that the first connection lead 5 is connected to the first end 4 of the first touch signal line 2-1.

Figure 13:
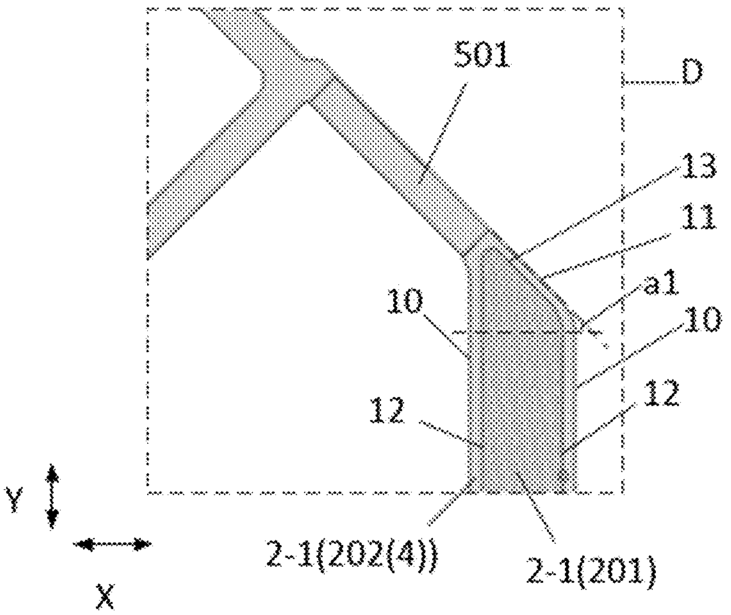
FIG. 13 is an enlarged structural schematic diagram of an area D of FIG. 12 according to an embodiment of the present disclosure.

It should be noted that, an enlarged schematic diagram of a D area of FIG. 12 is shown in FIG. 13. An enlarged schematic diagram of a E area of FIG. 14 is shown in FIG. 15.

Figure 15:
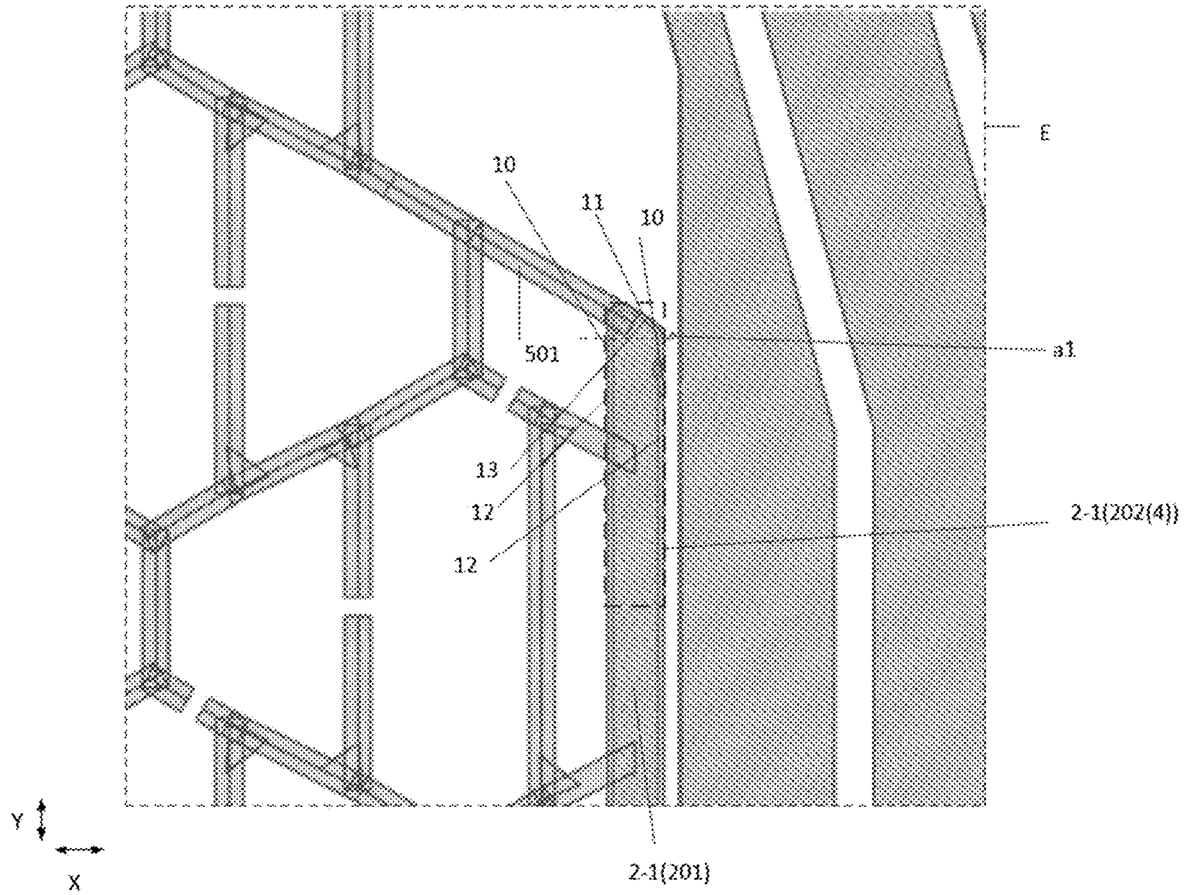
FIG. 15 is an enlarged structural schematic diagram of an area E of FIG. 14 according to an embodiment of the present disclosure.

In some embodiments, as shown in FIG. 13 and FIG. 15, a pattern of an orthographic projection of the first end 4 on the base 1 includes two first sides 10 extending in the second direction Y and a second side 11 connecting the two first sides 10; and an angle a1 between an extension direction of the second side 11 and the first direction X is greater than 0 and less than 90°.

In the touch substrate according to the embodiments of the present disclosure, an angle between an extension direction of the second side and the first direction is greater than 0 and less than 90°, that is, the first end has a chamfer relative to the first direction, and the line width of the first end gradually decreases along the second direction and towards an outermost edge direction of the first end, which can further prevent cracks in this area.

In some embodiments, the angle a1 between the extension direction of the second side and the first direction X is greater than or equal to 30° and less than and equal to 60°.

In a specific implementation, since the metal line is connected to the first end of the first touch signal line, the extension direction of the second side is, for example, the same as the extension direction of the metal line connected to the first end. The extension direction of the metal line is generally related to the shape of the metal mesh structure, and the angle a1 may be designed according to the specific shape of the metal mesh structure.

In some embodiments, as shown in FIG. 13, preferably, the angle a1 between the extension direction of the second side 11 and the first direction X is 45°.

In the embodiments of the present disclosure, when the shape of the metal mesh structure is a square and the angle between the extension direction of the metal line and the first direction is 45°, the extension direction of the second side is the same as the extension direction of the metal line, which facilitates the connection between the first end and the metal line, and is conducive to reducing the design and manufacturing difficulties of the touch substrate.

In some embodiments, as shown in FIG. 15, the angle a1 between the extension direction of the second side 11 and the first direction X is 30°.

In a specific implementation, the first connection lead is disposed in a same layer and connected to one layer of touch signal sub-lines of the touch signal line, and the first end is an end of a signal sub-line in the touch signal line that is disposed in the same layer as the first connection lead. That is, if the first connection lead is disposed in the same layer as a first touch signal sub-line, the first end is an end of the first touch signal sub-line. If the first connection lead is disposed in the same layer as a second touch signal sub-line, the first end is an end of the second touch signal sub-line.

In some embodiments, as shown in FIG. 13, the first connection lead is disposed in the same layer as a second touch signal sub-line 202, and the first end 4 is an end of the second touch signal sub-line 202.

In a specific implementation, for example, the second touch signal sub-line, the connection lead, the first electrode block, the second electrode block, and the first connection portion are disposed in the same layer, and the second connection portion and the first touch signal sub-line are disposed in the same layer.

In some embodiments, as shown in FIG. 13 and FIG. 15, in the bending area 101, while the first connection lead 501 is connected to the first end 4, the orthographic projection of the first touch signal sub-line 201 on the base 1 is located in the orthographic projection of the second touch signal sub-line 202 on the base 1.

That is, the implementation scheme 1 and the implementation scheme 2 according to the embodiments of the present disclosure may be combined.

In the touch substrate according to the embodiments of the present disclosure, in the bending area, the orthographic projection of the first touch signal sub-line on the base is located in the orthographic projection of the second touch signal sub-line on the base, and the first connection lead is connected to the first end, that is, by setting line widths of touch signal sub-lines included in a touch signal line and by setting a connection position of the first connection lead and the first touch signal line, a crack is prevented from appearing in the first insulating layer in the bending area in various manners, and the crack is prevented from extending along the touch signal line, which is more conducive to prolonging the service life of the touch substrate.

It should be noted that, referring to FIG. 13 and FIG. 15, description is made only based on an example that in the first touch signal line electrically connected to the first connection lead 501, in the bending area 101, the orthographic projection of the first touch signal sub-line 201 on the base 1 is located in the orthographic projection of the second touch signal sub-line 202 on the base 1. In a specific implementation, in the bending area, in each of the touch signal lines, the orthographic projection of the first touch signal sub-line on the base is located in the orthographic projection of the second touch signal sub-line on the base.

In some embodiments, as shown in FIG. 13 and FIG. 15, the first end 4 of the first touch signal line 2 is an end of the second touch signal sub-line 202 included in the first touch signal line 2;

- a pattern of an orthographic projection of the end of the second touch signal sub-line 202 on the base 1 includes two third sides 12 extending in the second direction Y and a fourth side 13 connecting the two third sides 12;
- an extension direction of the second side 11 is same as an extension direction of the fourth side 13; and
- an orthographic projection of the end of the second touch signal sub-line 202 on the base 1 covers the fourth side 13.

That is, at the end of the extension direction of the first touch signal line, not only the third sides but also the fourth side are covered by the second touch signal sub-line. In this way, portions of the first insulating layer covering the third sides and the fourth side are covered by the second touch signal sub-line, thereby preventing a crack from appearing in the first insulating layer in an area of the end of the touch signal line, and further preventing the crack from extending to the first touch signal sub-line.

In some embodiments, as shown in FIG. 3, in the bending area 101, in the same touch signal line 2, a distance h1 in the first direction X between an edge of the first touch signal sub-line 201 and an edge of the second touch signal sub-line 202 located on a same side is greater than 0.

Thus, it can be ensured that the orthographic projection of the second touch signal sub-line on the base completely covers the orthographic projection of the first touch signal sub-line on the base, and accordingly, portions of the first insulating layer covering the edges on both sides of the first touch signal sub-line are covered by the orthographic projection of the second touch signal sub-line on the base, thereby preventing a crack from appearing in the first insulating layer, and further preventing the crack from extending to the first touch signal sub-line.

In a specific implementation, for example, h1 is greater than or equal to 1.2 μm and less than or equal to 1.5 μm. In order to ensure that within a process error range of the manufacture of the touch substrate, the orthographic projection of the second touch signal sub-line on the base completely covers the orthographic projection of the first touch signal sub-line on the base, h1 is, for example, 1.2 μm.

In some embodiments, as shown in FIG. 5 to FIG. 7, the touch substrate further includes a first insulating layer 8 located between the first touch signal sub-line 201 and the second touch signal sub-line 202;

- in the bending area 101, the first insulating layer 8 includes first via holes 801 corresponding to the touch signal lines 2 one to one; and
- an orthographic projection of the first via hole 801 on the base 1 covers the orthographic projection of the first touch signal sub-line 201 on the base 1 in the bending area 101.

That is, the first insulating layer between the first touch signal sub-line and the second touch signal sub-line in the bending area is removed, and the second signal sub-line is directly in contact with the first signal sub-line in the bending area. Moreover, the orthographic projection of the first via hole on the base covers the orthographic projection of the first touch signal sub-line on the base in the bending area, and the first insulating layer between adjacent touch signal lines is retained. The first insulating layer between adjacent touch signal lines may act as a retaining wall to prevent the extension of a crack, avoid an influence on the transmission of touch signals, improve the yield of the product, and prolong the service life of the touch substrate.

In some embodiments, the orthographic projection of the first via hole on the base substantially coincides with the orthographic projection of the first touch signal sub-line on the base in the bending area, or, the orthographic projection of the first touch signal sub-line on the base in the bending area is located in the orthographic projection of the first via hole on the base.

Of course, in some embodiments, in the bending area on the side of the touch area, as shown in FIG. 8, the first insulating layer 8 includes only one first via hole 801, and an orthographic projection of the first via hole 801 on the base 1 covers orthographic projections of a plurality of first touch signal sub-lines 201 on the base 1. That is, in a specific implementation, the first insulating layer is completely removed from the bending area on the side of the touch area. In this way, a crack is prevented from appearing in and extending from the first insulating layer in the bending area.

In some embodiments, as shown in FIG. 9, in the non-bending area 102, the orthographic projection of the first touch signal sub-line 201 on the base 1 substantially coincides with the orthographic projection of the second touch signal sub-line 202 on the base 1.

In some embodiments, as shown in FIG. 9, for at least some of the plurality of touch signal lines 2, in the first direction X, a line width of the first touch signal sub-line 201 in the bending area 101 is smaller than a line width thereof in the non-bending area 102, and a line width of the second touch signal sub-line 202 in the bending area 101 is equal to a line width thereof in the non-bending area 102.

Alternatively, in some embodiments, as shown in FIG. 5 and FIG. 10, in the non-bending area 102, the orthographic projection of the first touch signal sub-line 201 on the base 1 is located in the orthographic projection of the second touch signal sub-line 202 on the base 1.

Alternatively, in some embodiments, the line width of the first touch signal sub-line in the bending area is not equal to the line width thereof in the non-bending area, and/or the line width of the second touch signal sub-line in the bending area is not equal to the line width thereof in the non-bending area.

In some embodiments, in the first direction, a difference between a width of the second touch signal sub-line and a width of the first touch signal sub-line in the non-bending area is smaller than a difference between a width of the second touch signal sub-line and a width of the first touch signal sub-line in the bending area.

Of course, in a specific implementation, the touch signal line in the bending may also be disposed in other forms.

Figure 16:
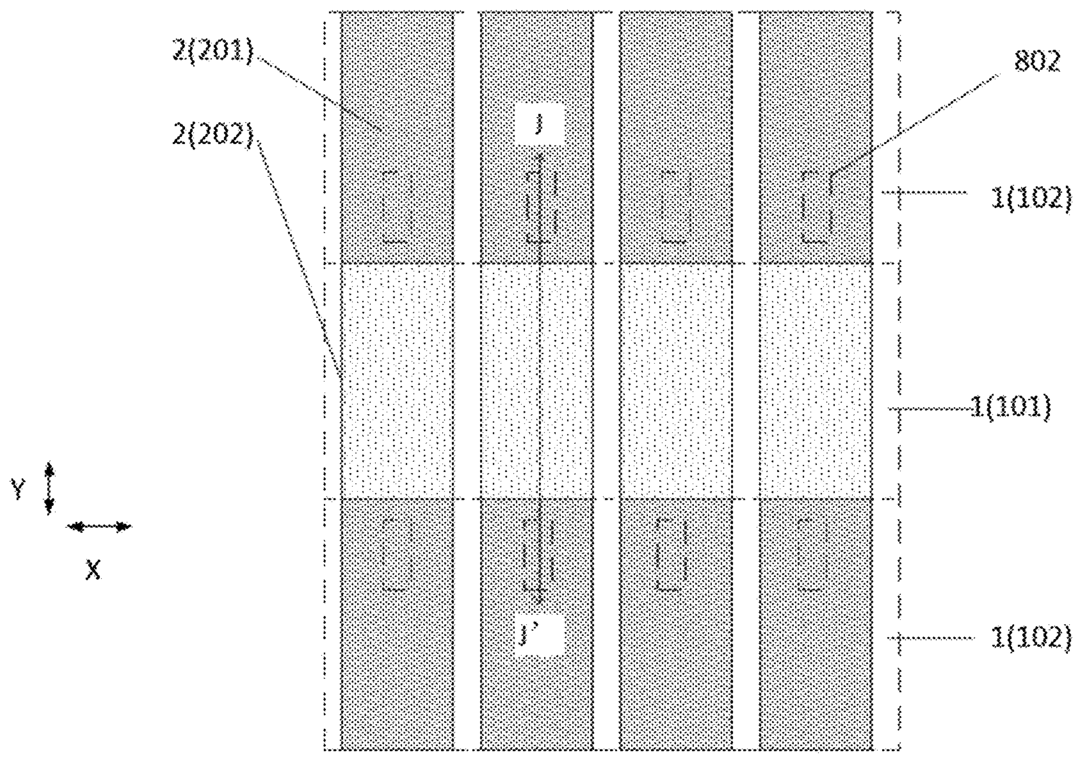
FIG. 16 is a schematic structural diagram of still another touch substrate according to an embodiment of the present disclosure.
Figure 17:
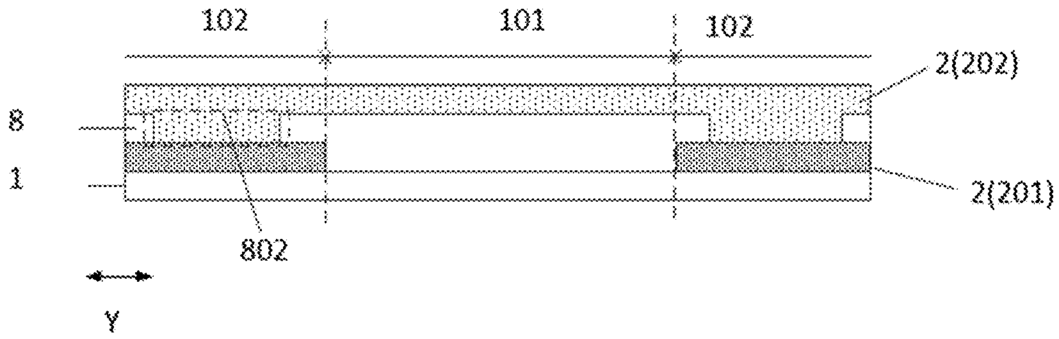
FIG. 17 is a cross-sectional view along CC' of FIG. 16 according to an embodiment of the present disclosure.
Figure 18:
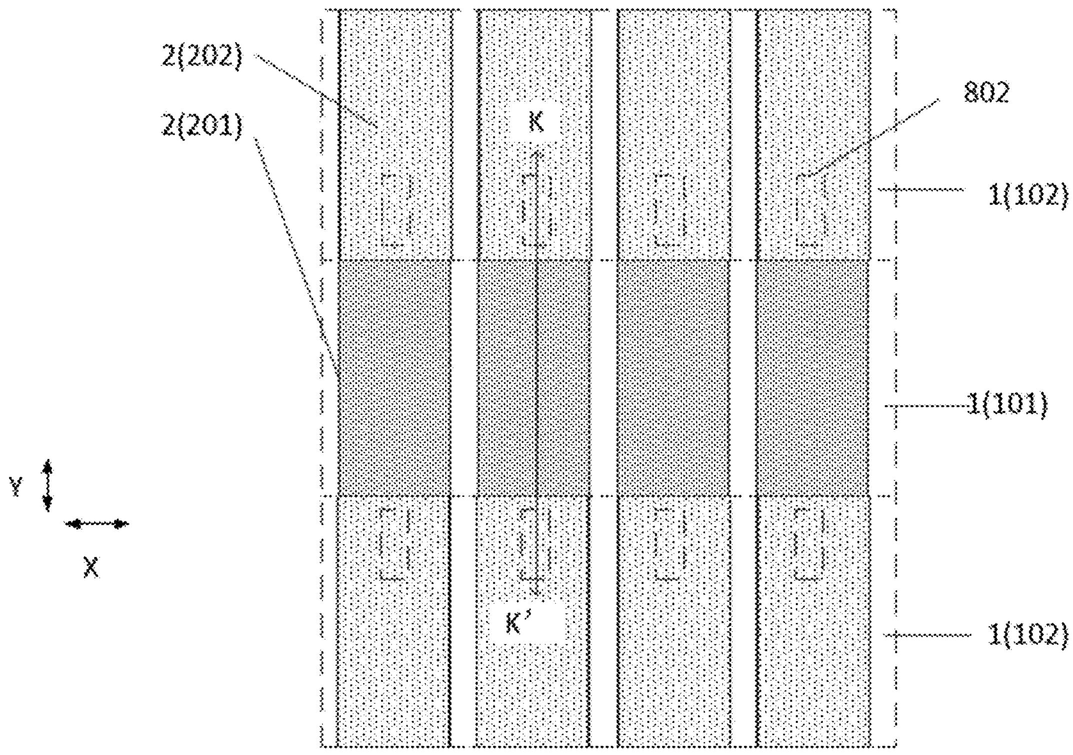
FIG. 18 is a schematic structural diagram of still another touch substrate according to an embodiment of the present disclosure.
Figure 19:
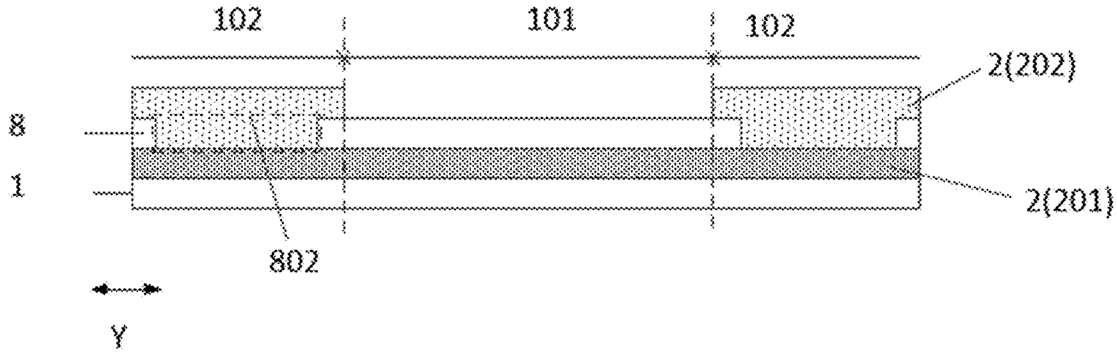
FIG. 19 is a cross-sectional view along KK' of FIG. 18 according to an embodiment of the present disclosure.

In some embodiments, as shown in FIG. 16 and FIG. 17, an orthographic projection of the first touch signal sub-line 201 on the base 1 does not overlap with the bending area 101, or, as shown in FIG. 18 and FIG. 19, an orthographic projection of the second touch signal sub-line 202 on the base 1 does not overlap with the bending area 101.

That is, in the touch substrate according to the embodiments of the present disclosure, the first touch signal sub-line or the second touch signal sub-line in the bending area is removed to prevent a crack from extending along the first touch signal sub-line or the second touch signal sub-line, and prevent the crack from affecting the transmission of touch signals, thereby prolonging the service life of the touch substrate.

It should be noted that, FIG. 17 is a cross-sectional view along JJ' of FIG. 16, and FIG. 19 is a cross-sectional view along KK' of FIG. 18.

In some embodiments, as shown in FIG. 16 to FIG. 19, on a side of the non-bending area 102 close to the bending area 101, the second touch signal sub-line 202 is electrically connected to the first touch signal sub-line 201 through at least one second via hole 802.

In the touch substrate according to the embodiments of the present disclosure, since the first touch signal sub-line or the second touch signal sub-line is removed from the bending area, on the side of the non-bending area close to the bending area, the second touch signal sub-line is connected to the first touch signal sub-line through the second via hole, which can improve the electrical connection performance of the second touch signal sub-line with the first touch signal sub-line through the second via hole, and is conductive to the transmission of touch signals.

It should be noted that, referring to FIG. 16 to FIG. 19, description is made based on an example that on a side of each of the non-bending areas 102 close to the bending area 101, each of the second touch signal sub-lines is electrically connected to the first touch signal sub-line 201 through one of the second via holes 802. Of course, in a specific implementation, on the side of each of the non-bending areas close to the bending area, each of the second touch signal sub-lines may also be electrically connected to the first touch signal sub-line through a plurality of second via holes.

In some embodiments, as shown in FIG. 16 and FIG. 18, in the non-bending area 102, the orthographic projection of the first touch signal sub-line 201 on the base 1 substantially coincides with the orthographic projection of the second touch signal sub-line 202 on the base 1.

Of course, in a specific implementation, in the non-bending area, the orthographic projection of the first touch signal sub-line on the base may also be set to be located in the orthographic projection of the second touch signal sub-line on the base.

Figure 20:
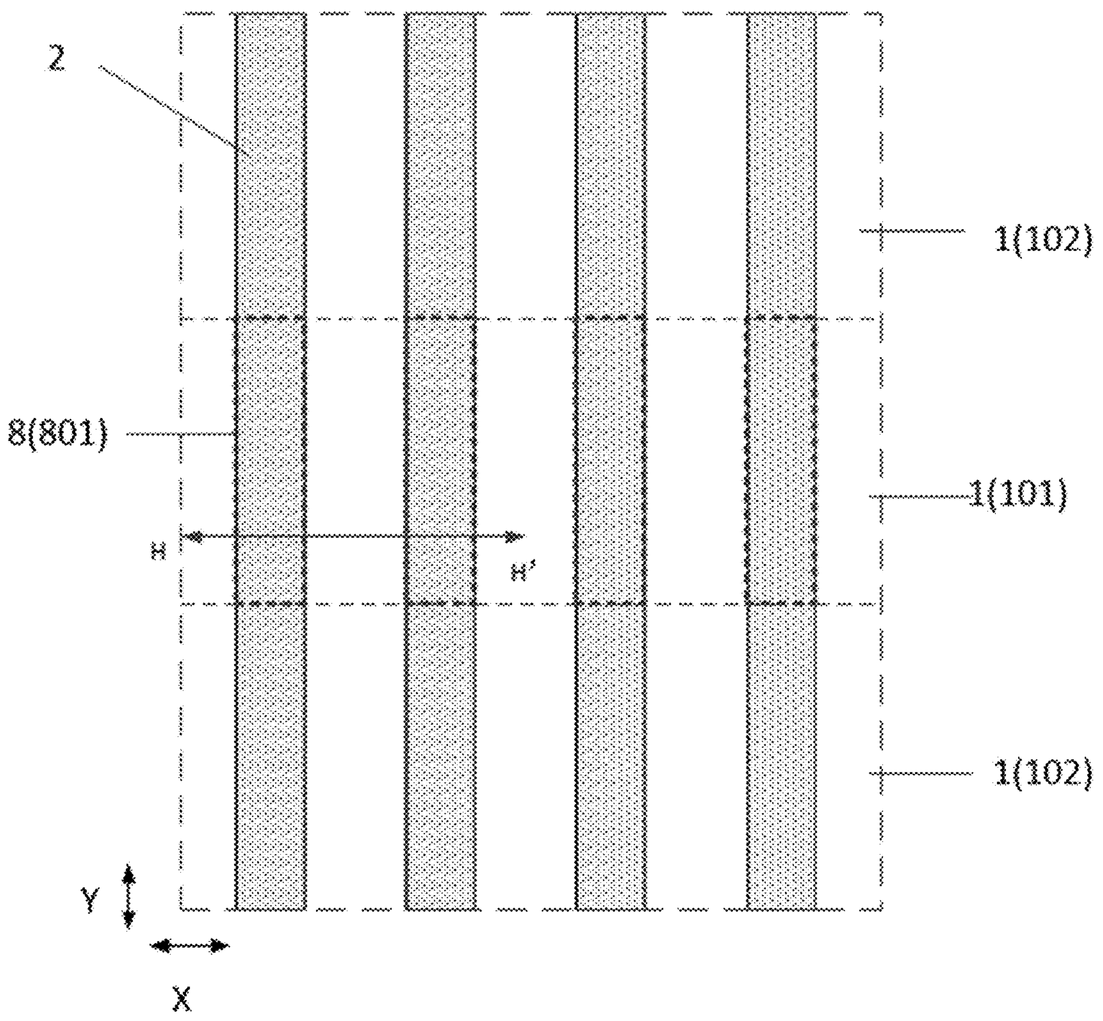
FIG. 20 is a schematic structural diagram of still another touch substrate according to an embodiment of the present disclosure.
Figure 21:
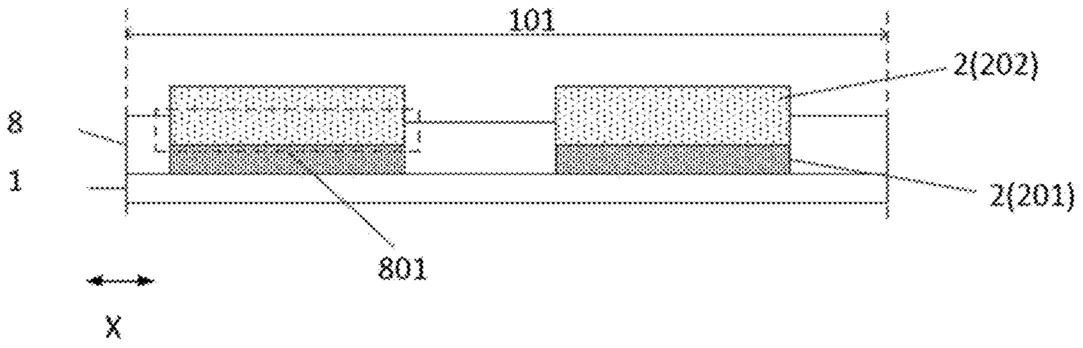
FIG. 21 is a cross-sectional view along HH' of FIG. 20 according to an embodiment of the present disclosure.

Alternatively, in some embodiments, as shown in FIG. 20 and FIG. 21, in the bending area 101, the orthographic projection of the first touch signal sub-line 201 on the base 1 substantially coincides with the orthographic projection of the second touch signal sub-line 202 on the base 1;

the touch substrate further includes a first insulating layer 8 located between the first touch signal sub-line 201 and the second touch signal sub-line 202; in the bending area 101, the first insulating layer includes first via holes 801 corresponding to the touch signal lines 2 one to one; and an orthographic projection of the first via hole 801 on the base 1 covers the orthographic projection of the first touch signal sub-line 201 on the base 1 in the bending area 101.

That is, the first insulating layer between the first touch signal sub-line and the second touch signal sub-line in the bending area is removed, and the second signal sub-line is directly in contact with the first signal sub-line in the bending area. Moreover, the orthographic projection of the first via hole on the base covers the orthographic projection of the first touch signal sub-line on the base in the bending area, and the first insulating layer between adjacent touch signal lines is retained. The first insulating layer between adjacent touch signal lines may act as a retaining wall to prevent the extension of a crack, avoid an influence on the transmission of touch signals, improve the yield of the product, and prolong the service life of the touch substrate.

It should be noted that, FIG. 21 is a cross-sectional view along HH' of FIG. 20.

In some embodiments, the orthographic projection of the first via hole on the base substantially coincides with the orthographic projection of the first touch signal sub-line on the base in the bending area, or, the orthographic projection of the first touch signal sub-line on the base in the bending area is located in the orthographic projection of the first via hole on the base.

Figure 22:
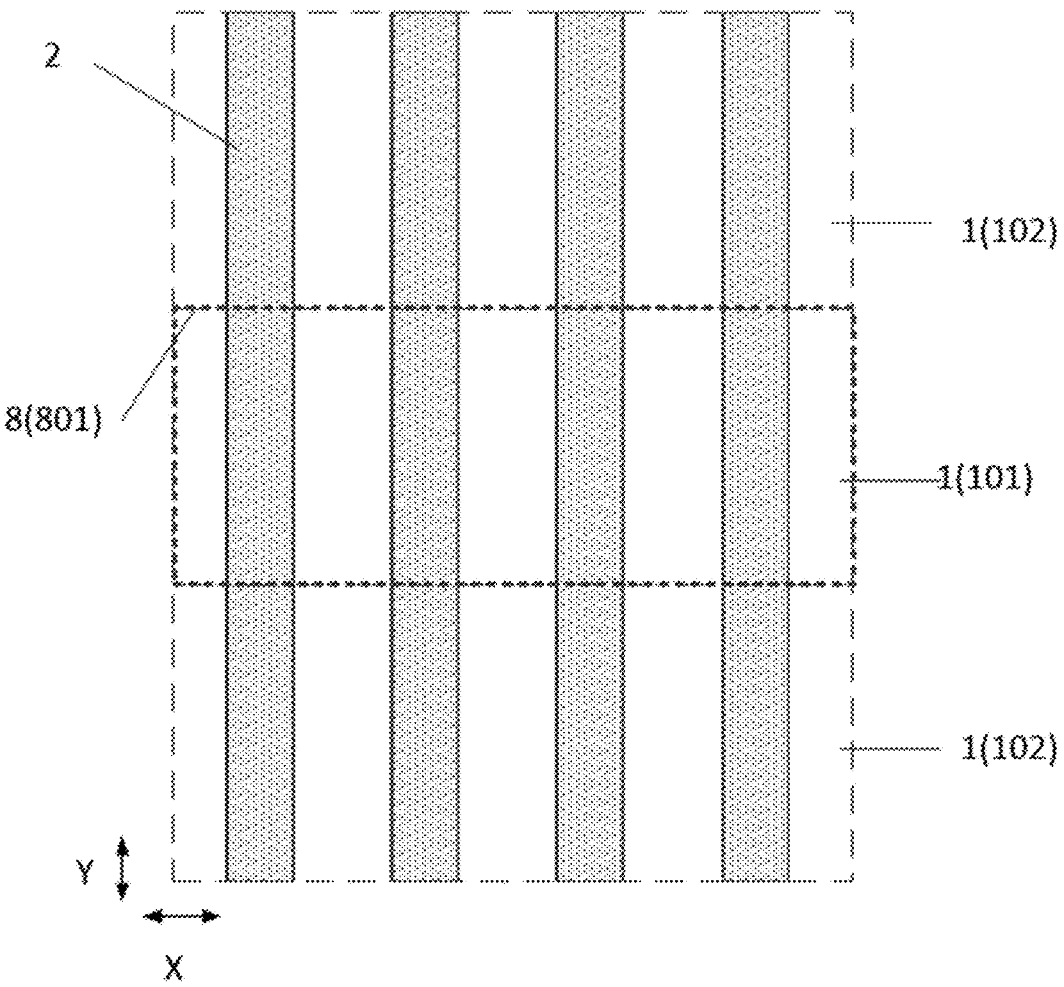
FIG. 22 is a schematic structural diagram of still another touch substrate according to an embodiment of the present disclosure.

Of course, in some embodiments, in the bending area on the side of the touch area, as shown in FIG. 22, the first insulating layer 8 includes only one first via hole 801, and an orthographic projection of the first via hole 801 on the base 1 covers orthographic projections of a plurality of first touch signal sub-lines 201 on the base 1. That is, in a specific implementation, the first insulating layer is completely removed from the bending area on the side of the touch area. In this way, a crack is prevented from appearing in and extending from the first insulating layer in the bending area.

In some embodiments, as shown in FIG. 20 and FIG. 22, in the non-bending area 102, the orthographic projection of the first touch signal sub-line 201 on the base 1 substantially coincides with the orthographic projection of the second touch signal sub-line 202 on the base 1.

Alternatively, in some embodiments, in the non-bending area, the orthographic projection of the first touch signal sub-line on the base may also be set to be located in the orthographic projection of the second touch signal sub-line on the base.

Of course, there are other factors that cause cracks in the bending area.

Figure 23:
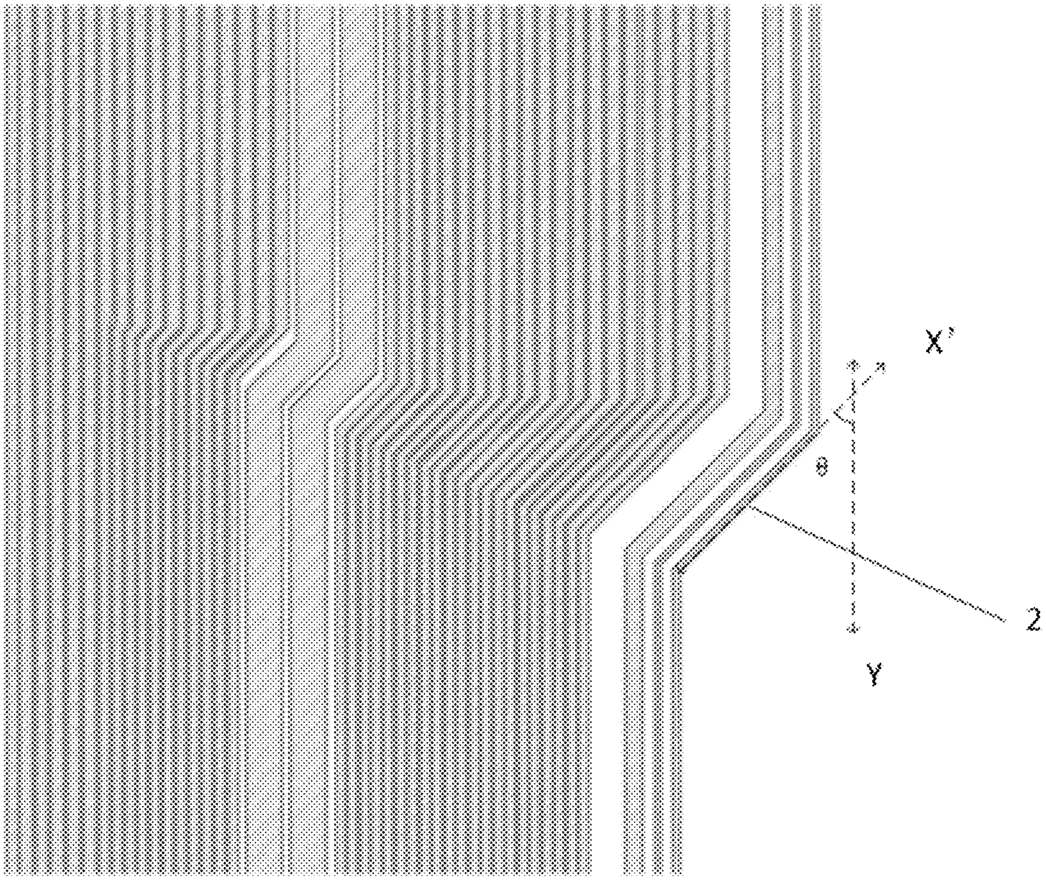
FIG. 23 is a schematic structural diagram of another touch substrate according to the related art.
Figure 24:
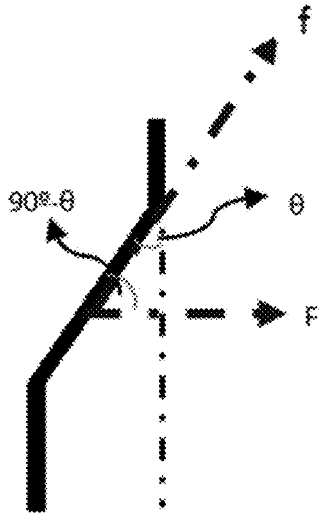
FIG. 24 is a schematic diagram of a force analysis of a touch signal line in the touch substrate according to the related art.

In the related art, in the bending area, as shown in FIG. 23, at least some of the touch signal lines 2 include portions extending in a third direction X', and the angle between the third direction X' and the second direction Y is 45°. When the touch substrate is bent, a force analysis of the touch signal line is shown in FIG. 24. The portion of the touch signal line extending in the third direction receives a force $f=F*Cos(90°-\theta)$. When θ is 45°, f is large, a crack is prone to appear in the first insulating layer in this area under the force, and the crack is prone to extend to the touch signal line.

Implementation Scheme III

Figure 25:
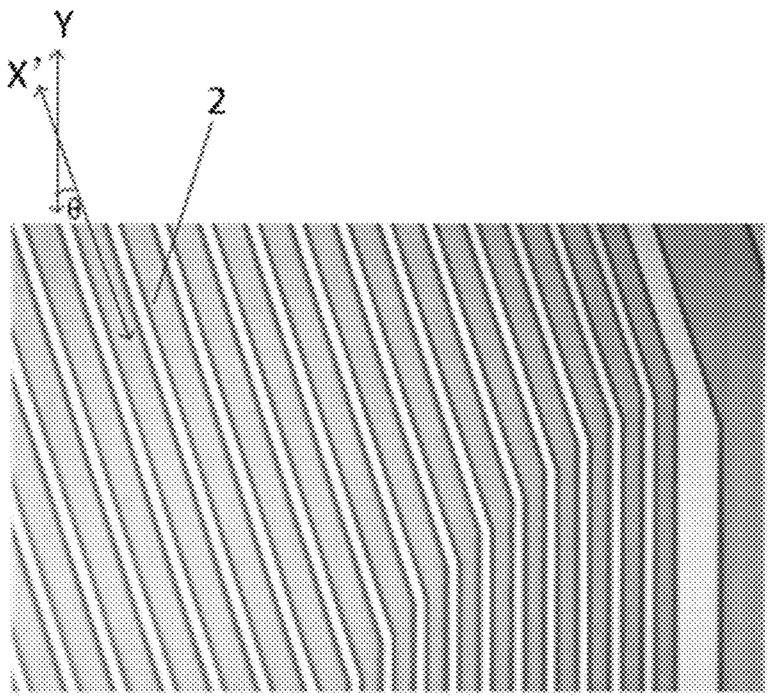
FIG. 25 is a schematic structural diagram of still another touch substrate according to an embodiment of the present disclosure.

Embodiments of the present disclosure provide a touch substrate, as shown in FIG. 25, in the bending area 101, at least some of the touch signal lines 2 include portions extending in a third direction X'; and an angle θ between the third direction X' and a second direction Y is greater than 0 and less than or equal to 20°.

In the touch substrate according to the embodiments of the present disclosure, in the bending area, an angle between the third direction and the second direction is greater than 0 and less than or equal to 20°, that is, the angle between the portions of at least some of the touch signal lines extending in the third direction and the second direction Y is greater than 0 and less than or equal to 20°. The angle between the portion of the touch signal line extending in the third direction and the second direction Y is small. Even if the touch substrate is bent in this area, the portion included in the touch signal line extending in the third direction receives a small force, which can prevent a crack from appearing in and extending from a first insulating layer in an area corresponding to the portion of the touch signal line extending in the third direction due to bending under the force, can improve the yield of the product, and can prolong the service life of the touch substrate.

Figure 26:
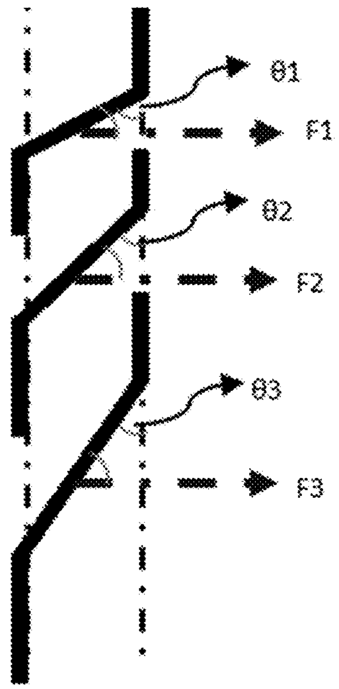
FIG. 26 is a schematic diagram of a comparison between a force analysis of a touch signal line in a touch substrate according to an embodiment of the present disclosure with the force analysis of the touch signal line in the touch substrate according to the related art.

It should be noted that, as shown in FIGS. 26, θ1 and θ2 are respectively angles between the third direction X' and the second direction Y according to the embodiments of the present disclosure, θ1 is 15°, θ2 is 20°, and θ3 is 45°. Compared with the prior art where θ3 is 45°, the angle between the third direction X' and the second direction Y is reduced in the touch substrate according to the embodiments of the present disclosure, $Cos(90°-\theta 1)$ is less than $Cos(90°-\theta 3)$, $F\mathbf{1}*Cos(90°-\theta 1)$ is less than $F\mathbf{3}*Cos(90°-\theta 3)$, $Cos(90°-\theta 2)$ is less than $Cos(90°-\theta 3)$, $F\mathbf{2}*Cos(90°-\theta 2)$ is less than $F\mathbf{3}*Cos(90°-\theta 3)$, $Cos(90°-\theta)$ is reduced accordingly, and then $f=F\mathbf{1}*Cos(90°-\theta 1)$ and $f=F\mathbf{2}*Cos(90°-\theta 2)$ are also reduced accordingly.

It should be noted that, in the second direction Y, the farther away from the pad electrode, the smaller the quantity of touch signal lines in the peripheral area, that is, a touch signal line in the peripheral area farther away from the pad electrode has a larger wiring space. Therefore, the line widths in the first direction of the same touch signal line may be set not completely the same in different areas. For a touch signal line, the wiring position of the touch signal line may be changed by setting a portion thereof extending in the third direction.

In a specific implementation, according to the formula $f=F*Cos(90°-\theta)$, theoretically, the smaller the θ, the smaller the force received by the portion of the touch signal line extending in the third direction. However, given that the touch signal line has different wiring spaces in different areas, the angle of the portion of the touch signal line extending in the third direction should be set in a manner that avoids wiring positions of the other touch signal lines, and the portion of the first touch signal line extending in the second direction should be connected to the connection lead. The smaller the θ, the shorter the area where the touch electrode is connected to the touch signal line through a connection lead. In order to ensure the size of the connection area, the angle between the third direction X' and the second direction Y should be set within a certain range.

In some embodiments, the angle between the third direction X' and the second direction Y is greater than or equal to 10° and less than and equal to 15°.

In a specific implementation, for example, preferably, the angle between the third direction X' and the second direction Y is 15°. Thereby, the portion of the touch signal line extending in the third direction can receive a small force while the size of the area where the touch electrode is connected to the touch signal line through the connection lead is ensured.

In some embodiments, in the non-bending area, at least some of the touch signal lines include portions extending in the third direction; and the angle between the third direction and the second direction is greater than 0 and less than or equal to 20°.

It should be noted that, in some embodiments, the edge of the touch substrate needs to be bent in a Z direction, the peripheral area is generally bent in the Z direction to form a curved surface, and the Z direction is a direction perpendicular to a plane of the first direction and the second direction. The touch signal line and the first insulating layer in the non-bending area will also receive a force. Therefore, in a non-peripheral area, the angle between the portion of the touch signal line extending in the third direction and the second direction Y is small, so that the portion included in the touch signal line extending in the third direction in the non-peripheral area receives a small force, which can prevent a crack from appearing in and extending from a first insulating layer corresponding to the portion of the touch signal line extending in the third direction due to bending under the force, and can prolong the service life of the touch substrate.

Furthermore, in some embodiments, in the non-bending area, the angle between the third direction X' and the second direction Y is greater than or equal to 10° and less than and equal to 15°. In a specific implementation, for example, preferably, the angle between the third direction X' and the second direction Y is 15°. Thereby, the portion of the touch signal line extending in the third direction can receive a small force while the size of the area where the touch electrode is connected to the touch signal line through the connection lead is ensured.

In a specific implementation, the implementation scheme III may be combined with the implementation scheme I and/or the implementation scheme II.

In some embodiments, in the bending area, the orthographic projection of the first touch signal sub-line on the base is located in the orthographic projection of the second touch signal sub-line on the base.

In the touch substrate according to the embodiments of the present disclosure, in the bending area, the orthographic projection of the first touch signal sub-line on the base is located in the orthographic projection of the second touch signal sub-line on the base, and the angle between the portions of at least some of the touch signal lines extending in the third direction and the second direction Y is greater than 0 and less than or equal to 20°, that is, by setting line widths of touch signal sub-lines included in a touch signal line and by setting the angle of the portion of the touch signal line extending in the third direction, a crack is prevented from appearing in the first insulating layer in the bending area in various manners, and the crack is prevented from extending along the touch signal line, which is more conducive to prolonging the service life of the touch substrate.

In some embodiments, as shown in FIG. 3, in the bending area 101, in a same touch signal line 2, a distance h1 in the first direction X between an edge of the first touch signal sub-line 201 and an edge of the second touch signal sub-line 202 located on a same side is greater than 0.

Thus, it can be ensured that the orthographic projection of the second touch signal sub-line on the base completely covers the orthographic projection of the first touch signal sub-line on the base, and accordingly, portions of the first insulating layer covering the edges on both sides of the first touch signal sub-line are covered by the orthographic projection of the second touch signal sub-line on the base, thereby preventing a crack from appearing in the first insulating layer between the first touch signal sub-line and the second touch signal sub-line, and further preventing the crack from extending to the first touch signal sub-line.

In a specific implementation, for example, h1 is greater than or equal to 1.2 μm and less than or equal to 1.5 μm. In order to ensure that within a process error range of the manufacture of the touch substrate, the orthographic projection of the second touch signal sub-line on the base completely covers the orthographic projection of the first touch signal sub-line on the base, h1 is, for example, 1.2 μm.

In some embodiments, as shown in FIG. 5 to FIG. 7, the touch substrate further includes a first insulating layer 8 located between the first touch signal sub-line 201 and the second touch signal sub-line 202;

in the bending area 101, the first insulating layer 8 includes first via holes 801 corresponding to the touch signal lines 2 one to one; and an orthographic projection of the first via hole 801 on the base 1 covers the orthographic projection of the first touch signal sub-line 201 on the base 1 in the bending area 101.

That is, the first insulating layer between the first touch signal sub-line and the second touch signal sub-line in the bending area is removed, and the second signal sub-line is directly in contact with the first signal sub-line in the bending area. Moreover, the orthographic projection of the first via hole on the base covers the orthographic projection of the first touch signal sub-line on the base in the bending area, that is, the first insulating layer between adjacent touch signal lines is retained. The first insulating layer between adjacent touch signal lines may act as a retaining wall to prevent the extension of a crack, improve the yield of the product, and prolong the service life of the touch substrate.

Of course, in some embodiments, in the bending area on the side of the touch area, as shown in FIG. 8, the first insulating layer 8 includes only one first via hole 801, and an orthographic projection of the first via hole 801 on the base 1 covers orthographic projections of a plurality of first touch signal sub-lines 201 on the base 1. That is, in a specific implementation, the first insulating layer is completely removed from the bending area on the side of the touch area. In this way, a crack is prevented from appearing in and extending from the first insulating layer in the bending area.

In some embodiments, as shown in FIG. 9, in the non-bending area 102, the orthographic projection of the first touch signal sub-line 201 on the base 1 substantially coincides with the orthographic projection of the second touch signal sub-line 202 on the base 1.

In some embodiments, as shown in FIG. 9, for at least some of the plurality of touch signal lines 2, in the first direction X, a line width of the first touch signal sub-line 201 in the bending area 101 is smaller than a line width thereof in the non-bending area 102, and a line width of the second touch signal sub-line 202 in the bending area 101 is equal to a line width thereof in the non-bending area 102.

In some embodiments, as shown in FIG. 5 and FIG. 10, in the non-bending area 102, the orthographic projection of the first touch signal sub-line 201 on the base 1 is located in the orthographic projection of the second touch signal sub-line 202 on the base 1.

That is, in the non-bending area, the line width in the first direction of the first touch signal sub-line in a lower layer is smaller than the line width of the second touch signal sub-line in an upper layer.

In some embodiments, as shown in FIG. 10, for at least some of the plurality of touch signal lines 2, in the first direction X, the line width of the first touch signal sub-line 201 in the bending area 101 is equal to the line width thereof in the non-bending area 102, and the line width of the second touch signal sub-line 202 in the bending area 101 is equal to the line width thereof in the non-bending area 102.

Alternatively, in some embodiments, the line width of the first touch signal sub-line in the bending area is not equal to the line width thereof in the non-bending area, and/or the line width of the second touch signal sub-line in the bending area is not equal to the line width thereof in the non-bending area.

In some embodiments, in the first direction, a difference between a width of the second touch signal sub-line and a width of the first touch signal sub-line in the non-bending area is smaller than a difference between a width of the second touch signal sub-line and a width of the first touch signal sub-line in the bending area.

Of course, when the angle between the portions of at least some of the touch signal lines extending in the third direction and the second direction Y is greater than 0 and less than or equal to 20°, in a specific implementation, the touch signal line in the bending may also be disposed in other forms.

In some embodiments, as shown in FIG. 16 and FIG. 17, an orthographic projection of the first touch signal sub-line 201 on the base 1 does not overlap with the bending area 101, or, as shown in FIG. 18 and FIG. 19, an orthographic projection of the second touch signal sub-line 202 on the base 1 does not overlap with the bending area 101.

That is, in the touch substrate according to the embodiments of the present disclosure, the first touch signal sub-line or the second touch signal sub-line in the bending area is removed to prevent a crack from appearing in the first insulating layer and extending along the first touch signal sub-line or the second touch signal sub-line, and prevent the crack from affecting the transmission of touch signals, thereby prolonging the service life of the touch substrate.

In some embodiments, as shown in FIG. 16 to FIG. 19, on a side of the non-bending area 102 close to the bending area 101, the second touch signal sub-line 202 is electrically connected to the first touch signal sub-line 201 through at least one second via hole 802.

In the touch substrate according to the embodiments of the present disclosure, since the first touch signal sub-line or the second touch signal sub-line is removed from the bending area, on the side of the non-bending area close to the bending area, the second touch signal sub-line is connected to the first touch signal sub-line through the second via hole, which can improve the electrical connection performance of the second touch signal sub-line with the first touch signal sub-line through the second via hole, and is conductive to the transmission of touch signals.

It should be noted that, referring to FIG. 16 to FIG. 19, description is made based on an example that on a side of each of the non-bending areas 102 close to the bending area 101, each of the second touch signal sub-lines is electrically connected to the first touch signal sub-line 201 through one of the second via holes 802. Of course, in a specific implementation, on the side of each of the non-bending areas close to the bending area, each of the second touch signal sub-lines may also be electrically connected to the first touch signal sub-line through a plurality of second via holes.

In some embodiments, as shown in FIG. 16 and FIG. 18, in the non-bending area 102, the orthographic projection of the first touch signal sub-line 201 on the base 1 substantially coincides with the orthographic projection of the second touch signal sub-line 202 on the base 1.

Of course, in a specific implementation, in the non-bending area, the orthographic projection of the first touch signal sub-line on the base may also be set to be located in the orthographic projection of the second touch signal sub-line on the base.

Alternatively, in some embodiments, as shown in FIG. 20 and FIG. 21, in the bending area 101, the orthographic projection of the first touch signal sub-line 201 on the base 1 substantially coincides with the orthographic projection of the second touch signal sub-line 202 on the base 1;

- the touch substrate further includes a first insulating layer 8 located between the first touch signal sub-line 201 and the second touch signal sub-line 202; in the bending area 101, the first insulating layer includes first via holes 801 corresponding to the touch signal lines 2 one to one; and
- an orthographic projection of the first via hole 801 on the base 1 covers the orthographic projection of the first touch signal sub-line 201 on the base 1 in the bending area 101.

That is, the first insulating layer between the first touch signal sub-line and the second touch signal sub-line in the bending area is removed, and the second signal sub-line is directly in contact with the first signal sub-line in the bending area. Moreover, the orthographic projection of the first via hole on the base covers the orthographic projection of the first touch signal sub-line on the base in the bending area, and the first insulating layer between adjacent touch signal lines is retained. The first insulating layer between adjacent touch signal lines may act as a retaining wall to prevent the extension of a crack, improve the yield of the product, and prolong the service life of the touch substrate.

In some embodiments, the orthographic projection of the first via hole on the base substantially coincides with the orthographic projection of the first touch signal sub-line on the base in the bending area, or, the orthographic projection of the first touch signal sub-line on the base in the bending area is located in the orthographic projection of the first via hole on the base.

Of course, in some embodiments, in the bending area on the side of the touch area, as shown in FIG. 22, the first insulating layer 8 includes only one first via hole 801, and an orthographic projection of the first via hole 801 on the base 1 covers orthographic projections of a plurality of first touch signal sub-lines 201 on the base 1. That is, in a specific implementation, the first insulating layer is completely removed from the bending area on the side of the touch area. In this way, a crack is prevented from appearing in and extending from the first insulating layer in the bending area.

In some embodiments, as shown in FIG. 20 and FIG. 22, in the non-bending area 102, the orthographic projection of the first touch signal sub-line 201 on the base 1 substantially coincides with the orthographic projection of the second touch signal sub-line 202 on the base 1.

Alternatively, in some embodiments, in the non-bending area, the orthographic projection of the first touch signal sub-line on the base 1 may also be set to be located in the orthographic projection of the second touch signal sub-line on the base.

In some embodiments, in the bending area, the first connection lead is connected to the first end.

In the touch substrate according to the embodiments of the present disclosure, in the bending area, the angle between the portions of at least some of the touch signal lines extending in the third direction and the second direction Y is greater than 0 and less than or equal to 20°, and the first connection lead is connected to the first end, that is, by setting the angle of the portion of the touch signal line extending in the third direction and by setting a connection position of the first connection lead and the first touch signal line, a crack is prevented from appearing in the bending area in various manners, which is more conducive to prolonging the service life of the touch substrate.

It should be noted that, in FIG. 13 and FIG. 15, description is made based on an example that among the first touch signal lines electrically connected to the first connection lead 501, in the bending area 101, the orthographic projection of the first touch signal sub-line 201 on the base 1 is located in the orthographic projection of the second touch signal sub-line 202 on the base 1. In a specific implementation, in the bending area, in each of the touch signal lines, the orthographic projection of the first touch signal sub-line on the base is located in the orthographic projection of the second touch signal sub-line on the base.

In some embodiments, as shown in FIG. 13 and FIG. 15, a pattern of an orthographic projection of the first end 4 on the base 1 includes two first sides 10 extending in the second direction Y and a second side 11 connecting the two first sides 10; and an angle a1 between an extension direction of the second side 11 and the first direction X is greater than 0 and less than 90°.

In the touch substrate according to the embodiments of the present disclosure, an angle between an extension direction of the second side and the first direction is greater than 0 and less than 90°, that is, the first end has a chamfer relative to the first direction, and the line width of the first end gradually decreases along the second direction and towards an outermost edge direction of the first end, which can further prevent cracks in this area.

In some embodiments, the angle a1 between the extension direction of the second side and the first direction X is greater than or equal to 30° and less than and equal to 60°.

In a specific implementation, since the metal line is connected to the first end of the first touch signal line, the extension direction of the second side is, for example, the same as the extension direction of the metal line connected to the first end. The extension direction of the metal line is generally related to the shape of the metal mesh structure, and the angle a1 may be designed according to the specific shape of the metal mesh structure.

In some embodiments, as shown in FIG. 13, the angle a1 between the extension direction of the second side 11 and the first direction X is 45°; as shown in FIG. 15, the angle a1 between the extension direction of the second side 11 and the first direction X is 30°.

In a specific implementation, the first connection lead is disposed in a same layer and connected to one layer of touch signal sub-lines of the touch signal line, and the first end is an end of a signal sub-line in the touch signal line that is disposed in the same layer as the first connection lead. That is, if the first connection lead is disposed in the same layer as a first touch signal sub-line, the first end is an end of the first touch signal sub-line. If the first connection lead is disposed in the same layer as a second touch signal sub-line, the first end is an end of the second touch signal sub-line.

In some embodiments, as shown in FIG. 13, the first connection lead is disposed in the same layer as a second touch signal sub-line 202, and the first end 4 is an end of the second touch signal sub-line 202.

In some embodiments, as shown in FIG. 13 and FIG. 15, the first end 4 of the first touch signal line 2 is an end of the second touch signal sub-line 202 included in the first touch signal line 2;

a pattern of an orthographic projection of the end of the second touch signal sub-line 202 on the base 1 includes two third sides 12 extending in the second direction Y and a fourth side 13 connecting the two third sides 12; and an extension direction of the second side 11 is same as an extension direction of the fourth side 13.

In a specific implementation, in the bending area, the orthographic projection of the first touch signal sub-line on the base is located in the orthographic projection of the second touch signal sub-line on the base, and in some embodiments, as shown in FIG. 11 and FIG. 13, the orthographic projection of the end of the second touch signal sub-line 202 on the base 1 covers the fourth side 13.

That is, at the end of the extension direction of the first touch signal line, not only the third sides but also the fourth side are covered by the second touch signal sub-line. In this way, portions of the first insulating layer covering the third sides and the fourth side are covered by the second touch signal sub-line, thereby preventing a crack from appearing in the first insulating layer in an area of the end of the touch signal line, and further preventing the crack from extending to the first touch signal sub-line.

Figure 27:
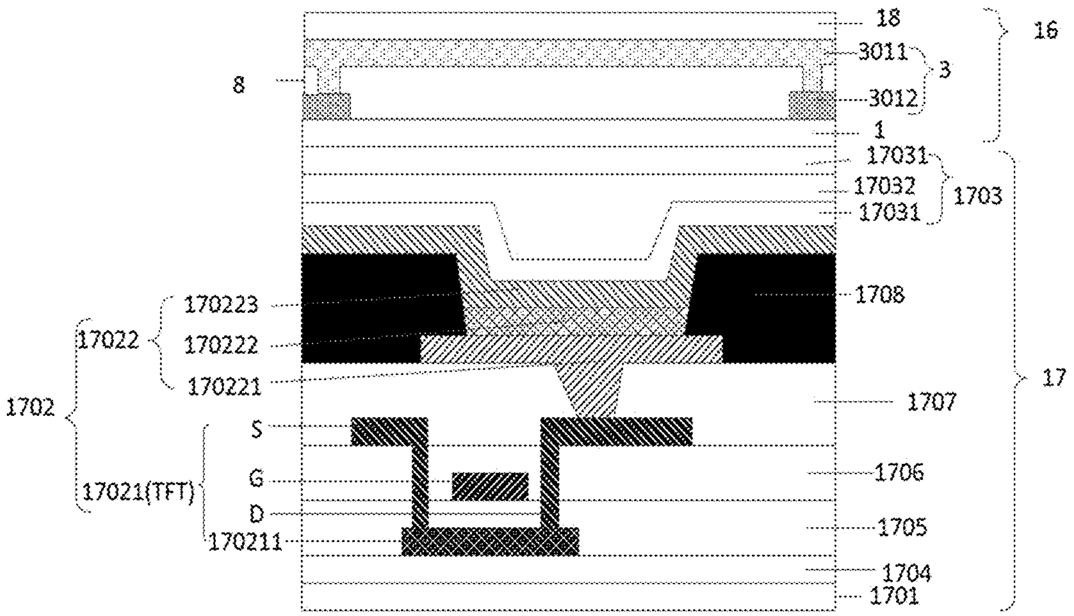
FIG. 27 is a schematic structural diagram of a display apparatus according to an embodiment of the present disclosure.

Embodiments of the present disclosure provide a display apparatus. As shown in FIG. 27, the display apparatus includes:

a touch substrate 16 according to the embodiments of the present disclosure; and a display substrate 17; where the touch substrate 16 is located on a light-emitting side of the display substrate 17.

In some embodiments, the display substrate includes a display area; and orthographic projections of the bending area and the non-bending area on the display substrate overlap with the display area. For example, the orthographic projection of the display area of the display substrate on a plane where the display apparatus is located coincides with the orthographic projection of the touch area of the touch substrate on the plane where the display apparatus is located.

In some embodiments, as shown in FIG. 27, the display substrate 17 includes:

a flexible base substrate 1701;

a display layer 1702 on the flexible base substrate 1701; and an encapsulation layer 1703 on the display layer 1702; where the touch substrate 16 is on the encapsulation layer 1703.

In a specific implementation, as shown in FIG. 27, the touch substrate 16 may be, for example, manufactured directly on the encapsulation layer 1703. The substrate 1 included in the touch substrate 16 may be, for example, a buffer layer formed on the encapsulation layer 1703. The touch substrate 16 further includes a protective layer 18 on a side of the touch electrode 3 facing away from the base 1.

In some embodiments, as shown in FIG. 27, the display layer 1702 includes a pixel driving circuit 17021 on the flexible base substrate 1701 and an electroluminescent device 17022 electrically connected to the pixel driving circuit 17021. The electroluminescent device may be, for example, an organic light-emitting diode device or a quantum dot light-emitting diode device.

In some embodiments, as shown in FIG. 27, the pixel driving circuit 17021 includes a thin film transistor TFT; the thin film transistor TFT includes: an active layer 170211, a gate G, a source S, and a drain D.

In a specific implementation, as shown in FIG. 27, the thin film transistor TFT is a top gate structure, that is, the gate G is on a side of the active layer 170211 facing away from the flexible base substrate 1701; the display substrate 17 also includes: a buffer layer 1704 located between the flexible base substrate 1701 and the active layer 170211, a gate insulating layer 1705 located between the active layer 170211 and the gate G, an interlayer insulating layer 1706 located between the gate G and the source S and drain D, and a planarization layer 1707 located between the source S and drain D and the electroluminescent device 17022. The material of the active layer may include, for example, silicon or an oxide semiconductor. The gate, the source and the drain may include, for example, a metal material.

It should be noted that, the pixel driving circuit may further include a larger quantity of thin film transistor and capacitor.

In some embodiments, as shown in FIG. 27, the electroluminescent device 17022 includes an anode 170221, a light-emitting functional layer 170222, and a cathode 170222 that are stacked. The display substrate 17 further includes: a pixel definition layer 1708 on a side of the planarization layer 1707 facing away from the flexible base substrate 1701. The pixel definition layer 1708 has a first opening area, the pixel definition layer 1708 covers the edge of the anode 170221, and the anode 170221, the light-emitting functional layer 170222, and the cathode 170223 are stacked in a first opening area 1091 to form the electroluminescent device 17022. The drain D is electrically connected to the anode 170221 of the electroluminescent device 17022.

In some embodiments, as shown in FIG. 27, the encapsulation layer 1703 is composed of an inorganic encapsulation layer 17031, an organic encapsulation layer 17032 and the inorganic encapsulation layer 17031 that are stacked.

The display apparatus according to the embodiments of the present disclosure is any product or component with a display function, such as a mobile phone, a tablet computer, a television, a display, a notebook computer, a digital photo frame and a navigator. Other essential components of the display apparatus should be understood to be provided by those skilled in the art, the descriptions thereof are omitted herein, and the components should not be regarded as limits to the present disclosure. The implementation of the display apparatus can refer to the implementation of the touch substrate, and the repetitions are not described herein again.

To sum up, in the touch substrate and the display apparatus according to the embodiments of the present disclosure, in the bending area, the orthographic projection of the first touch signal sub-line on the base is located in the orthographic projection of the second touch signal sub-line on the base. That is, in the bending area, a line width in the first direction of the first touch signal sub-line in a lower layer is smaller than a line width of the second touch signal sub-line in an upper layer. Such a setting is more conducive to the bending of the touch substrate along the bending axis. In addition, in the bending area, the orthographic projection of the first touch signal sub-line on the base is located in the orthographic projection of the second touch signal sub-line on the base, that is, in the bending area, the orthographic projection of the second touch signal sub-line on the base covers the orthographic projection of the first touch signal sub-line on the base. Accordingly, a portion of the first insulating layer covering the edge of the first touch signal sub-line is covered by the orthographic projection of the second touch signal sub-line on the base. Therefore, in the case of bending at a large angle, a crack can be prevented from appearing in the insulating layer between the first touch signal sub-line and the second touch signal sub-line, and further the crack can be prevented from extending to the first touch signal sub-line, thereby improving the yield of the product and prolonging the service life of the touch substrate. Since in the bending area, the first connection lead is connected to the first end of the first touch signal line, the connection between the first connection lead and the first touch signal line and the first end of the first touch signal line have a moment of 0, which can prevent a crack from appearing in the first insulating layer in an area corresponding to the connection between the first connection lead and the first touch signal line and extending to the first touch signal line, when the bending angle of the bending area is excessively large. In the bending area, an angle between the third direction and the first direction is greater than 0 and less than or equal to 20°, that is, the angle between the portions of at least some of the touch signal lines extending in the third direction and the first direction X is greater than 0 and less than or equal to 20°. The angle between the portion of the touch signal line extending in the third direction and the first direction X is small. Even if the touch substrate is bent in this area, the portion included in the touch signal line extending in the third direction receives a small force, which can prevent a crack from appearing in and extending from a first insulating layer in an area corresponding to the portion of the touch signal line extending in the third direction due to bending under the force, can improve the yield of the product, and can prolong the service life of the touch substrate.

Although the preferred embodiments of the present disclosure have been described, those skilled in the art benefiting from the underlying inventive concept can make additional modifications and variations to these embodiments. Therefore, the appended claims are intended to be construed as encompassing the preferred embodiments and all the modifications and variations coming into the scope of the present disclosure.

Evidently those skilled in the art can make various modifications and variations to embodiments of the present disclosure without departing from the spirit and scope of the present disclosure. Thus the present disclosure is also intended to encompass these modifications and variations therein as long as these modifications and variations to the present disclosure come into the scope of the claims of the present disclosure and their equivalents.

What is claimed is:

1. A touch substrate, comprising:

a base, comprising a bending area and a non-bending area located beyond the bending area; wherein the bending area extends in a first direction; and a plurality of touch signal lines on a side of the base;

wherein at least some of the touch signal lines extend to the bending area; each of the plurality of touch signal lines comprises: a first touch signal sub-line and a second touch signal sub-line on a side of the first touch signal sub-line facing away from the base; and in the bending area, an orthographic projection of the first touch signal sub-line on the base is located within an orthographic projection of the second touch signal sub-line on the base, and a length, along an extending direction of the first touch signal sub-line, of the orthographic projection of the first touch signal sub-line on the base is same as a length, along an extending direction of the second touch signal sub-line, of the orthographic projection of the second touch signal sub-line on the base.

2. The touch substrate according to claim 1, wherein, in the non-bending area, the orthographic projection of the first touch signal sub-line on the base substantially coincides with the orthographic projection of the second touch signal sub-line on the base.

3. The touch substrate according to claim 1, wherein, in the non-bending area, the orthographic projection of the first touch signal sub-line on the base is located with the orthographic projection of the second touch signal sub-line on the base.

4. The touch substrate according to claim 3, wherein, in the first direction, a difference between a width of the second touch signal sub-line and a width of the first touch signal sub-line in the non-bending area is smaller than a difference between a width of the second touch signal sub-line and a width of the first touch signal sub-line in the bending area.

5. The touch substrate according to claim 1, further comprising a first insulating layer located between the first touch signal sub-line and the second touch signal sub-line;

in the bending area, the first insulating layer comprises first via holes corresponding to the touch signal lines one to one; and an orthographic projection of the first via hole on the base covers the orthographic projection of the first touch signal sub-line on the base in the bending area.

6. The touch substrate according to claim 1, wherein, in the bending area, in a same touch signal line, a distance in the first direction between an edge of the first touch signal sub-line and an edge of the second touch signal sub-line located on a same side is greater than or equal to 1.2 μm and less than or equal to 1.5 μm.

7. The touch substrate according to claim 1, further comprising:

a plurality of first touch electrodes, which are located on a same side of the base as the touch signal lines, extend in the first direction, and are arranged in a second direction; wherein the first direction intersects with the second direction; and a plurality of first connection leads, which are located on the same side of the base as the touch signal lines;

wherein the plurality of touch signal lines comprise a plurality of first touch signal lines; first ends of at least some of the first touch signal lines are located in the bending area;

at least one end of the first touch electrode in an extension direction thereof is electrically connected to the first touch signal line through the first connection lead; and in the bending area, the first connection lead is connected to the first end of the first touch signal line.

8. The touch substrate according to claim 7, wherein a pattern of an orthographic projection of the first end on the base comprises two first sides extending in the second direction and a second side connecting the two first sides; and an angle between an extension direction of the second side and the first direction is greater than 0 and less than 90°.

9. The touch substrate according to claim 8, wherein the angle between the extension direction of the second side and the first direction is greater than or equal to 30° and less than and equal to 60°.

10. The touch substrate according to claim 8, wherein the first connection lead is disposed in a same layer as the first touch signal sub-line, and the first end is an end of the first touch signal sub-line; or, the first connection lead is disposed in a same layer as the second touch signal sub-line, and the first end is an end of the second touch signal sub-line.

11. The touch substrate according to claim 10, wherein the first end of the first touch signal line is an end of the second touch signal sub-line included in the first touch signal line;

a pattern of an orthographic projection of the end of the second touch signal sub-line on the base comprises two third sides extending in the second direction and a fourth side connecting the two third sides;

an extension direction of the second side is same as an extension direction of the fourth side; and an orthographic projection of the end of the second touch signal sub-line on the base covers the fourth side.

12. The touch substrate according to claim 1, wherein, in the bending area, at least some of the touch signal lines comprise portions extending in a third direction; and an angle between the third direction and the second direction is greater than 0 and less than or equal to 20°.

13. The touch substrate according to claim 12, wherein, in the non-bending area, at least some of the touch signal lines comprise portions extending in the third direction.

14. A touch substrate, comprising:

a base, comprising a bending area and a non-bending area located beyond the bending area; wherein the bending area extends in a first direction; and a plurality of touch signal lines on a side of the base; wherein the plurality of touch signal lines comprise a plurality of first touch signal lines; first ends of at least some of the first touch signal lines are located in the bending area;

a plurality of first touch electrodes located on a same side of the base as the touch signal lines; wherein the plurality of first touch electrodes extend in the first direction, and are arranged in a second direction, and the second direction intersects with the first direction; and a plurality of first connection leads located on the same side of the base as the touch signal lines; wherein at least one end of the first touch electrode in an extension direction thereof is electrically connected to the first touch signal line through the first connection lead; in the bending area, the first connection lead is connected to the first end of the first touch signal line;

wherein a pattern of an orthographic projection of the first end on the base comprises two first sides extending in the second direction and a second side connecting the two first sides; and an angle between an extension direction of the second side and the first direction is greater than 0 and less than 90°.

15. The touch substrate according to claim 14, wherein the angle between the extension direction of the second side and the first direction is greater than or equal to 30° and less than and equal to 60°.

16. The touch substrate according to claim 14, wherein each of the plurality of touch signal lines comprises: a first touch signal sub-line and a second touch signal sub-line on a side of the first sub-touch line facing away from the base;

the first connection lead is disposed in a same layer as the first touch signal sub-line, and the first end is an end of the first touch signal sub-line; or, the first connection lead is disposed in a same layer as the second touch signal sub-line, and the first end is an end of the second touch signal sub-line.

17. The touch substrate according to claim 16, wherein, in the bending area, an orthographic projection of the first touch signal sub-line on the base is located with an orthographic projection of the second touch signal sub-line on the base.

18. The touch substrate according to claim 17, wherein the first end is an end of the second touch signal sub-line;

a pattern of an orthographic projection of the end of the second touch signal sub-line on the base comprises two third sides extending in the second direction and a fourth side connecting the two third sides;

an extension direction of the second side is same as an extension direction of the fourth side; and an orthographic projection of the end of the second touch signal sub-line on the base covers the fourth side.

19. A touch substrate, comprising:

a base, comprising a bending area and a non-bending area located beyond the bending area; wherein the bending area extends in a first direction; and a plurality of touch signal lines on a side of the base; wherein at least some of the touch signal lines extend to the bending area; in the bending area, at least some of the touch signal lines comprise portions extending in a third direction; and an angle between the third direction and a second direction is greater than 0 and less than or equal to 20°, wherein the second direction is perpendicular to the first direction;

a plurality of first touch electrodes located on a same side of the base as the touch signal lines; wherein the plurality of first touch electrodes extend in the first direction, and are arranged in the second direction; and a plurality of first connection leads located on the same side of the base as the touch signal lines; wherein at least one end of the first touch electrode in an extension direction thereof is electrically connected to the first touch signal line through the first connection lead; in the bending area, the first connection lead is connected to the first end of the first touch signal line;

wherein the touch signal line comprises: a first touch signal sub-line and a second touch signal sub-line; and the first connection lead is disposed in a same layer as the first touch signal sub-line, and the first end is an end of the first touch signal sub-line; or, the first connection lead is disposed in a same layer as the second touch signal sub-line, and the first end is an end of the second touch signal sub-line.

* * * * *